US012596007B2

(12) United States Patent (10) Patent No.: US 12,596,007 B2
Fukukawa (45) Date of Patent: Apr. 7, 2026

(54) DISPLAY CONTROL APPARATUS, DISPLAY SYSTEM, DISPLAY METHOD, AND COMPUTER READABLE MEDIUM

(71) Applicant: NEC Corporation, Tokyo (JP)

(72) Inventor: Masatoshi Fukukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 138 days.

(21) Appl. No.: 18/575,397

(22) PCT Filed: Jul. 12, 2021

(86) PCT No.: PCT/JP2021/026105
§ 371 (c)(1),
(2) Date: Dec. 29, 2023

(87) PCT Pub. No.: WO2023/286115
PCT Pub. Date: Jan. 19, 2023

(65) Prior Publication Data
US 2024/0310174 A1      Sep. 19, 2024

(51) Int. Cl.
| | |
|---|---|
| *G01C 21/20* | (2006.01) |
| *A62B 3/00* | (2006.01) |
| *A62B 18/08* | (2006.01) |
| *G01S 13/06* | (2006.01) |
| *G06F 3/14* | (2006.01) |
| *G08B 21/02* | (2006.01) |

(52) U.S. Cl.
CPC .............. *G01C 21/20* (2013.01); *A62B 3/00* (2013.01); *A62B 18/08* (2013.01); *G01S 13/06* (2013.01); *G06F 3/14* (2013.01); *G08B 21/02* (2013.01)

(58) Field of Classification Search
None
See application file for complete search history.

(56) References Cited

U.S. PATENT DOCUMENTS

| | | | |
|---|---|---|---|
| 2013/0096819 A1* | 4/2013 | Tarnok | G01C 21/3844 |
| | | | 701/538 |
| 2016/0286263 A1* | 9/2016 | Jung | H04N 21/4312 |
| (Continued) | | | |

FOREIGN PATENT DOCUMENTS

| | | |
|---|---|---|
| JP | 2005-115796 A | 4/2005 |
| JP | 2006-318247 A | 11/2006 |
| (Continued) | | |

OTHER PUBLICATIONS

International Search Report for PCT Application No. PCT/JP2021/026105, mailed on Sep. 28, 2021.

*Primary Examiner* — Frank S Chen
(74) *Attorney, Agent, or Firm* — Sughrue Mion, PLLC

(57) ABSTRACT

A display control apparatus capable of finding the position of a working entity even when the site is not provided with an infrastructure is provided. A display control apparatus includes a position calculation unit and a display control unit. The position calculation unit calculates the position of each of a plurality of working entities relative to a reference point by using distance measurement result information indicating results of measurements of distances between a plurality of detection apparatuses. The display control unit performs control so that position information indicating the position of at least one working entities is displayed on a mask worn by a worker.

18 Claims, 17 Drawing Sheets

(56)  References Cited

U.S. PATENT DOCUMENTS

| | | | |
|---|---|---|---|
| 2016/0309827 A1* | 10/2016 | Dodson | A42B 3/0426 |
| 2019/0033594 A1* | 1/2019 | Patil | G02B 27/0176 |
| 2021/0055370 A1* | 2/2021 | Tolentino | G01S 5/14 |

FOREIGN PATENT DOCUMENTS

| | | |
|---|---|---|
| JP | 2011-048493 A | 3/2011 |
| JP | 2015-102880 A | 6/2015 |
| JP | 2018-081637 A | 5/2018 |
| WO | 2015/129055 A1 | 9/2015 |
| WO | 2017/158718 A1 | 9/2017 |

* cited by examiner

S12 — CALCULATE POSITION OF EACH OF PLURALITY OF WORKING ENTITY

S14 — PERFORM CONTROL SO THAT POSITION OF WORKING ENTITY IS DISPLAYED ON MASK OF WORKER

DISPLAY CONTROL APPARATUS, DISPLAY SYSTEM, DISPLAY METHOD, AND COMPUTER READABLE MEDIUM

This application is a National Stage Entry of PCT/JP2021/026105 filed on Jul. 12, 2021, the contents of all of which are incorporated herein by reference, in their entirety.

TECHNICAL FIELD

The present invention relates to a display control apparatus, a display system, a display method, and a computer readable medium.

BACKGROUND ART

Patent Literature 1 discloses a comprehensive disaster prevention system for assisting, when a fire occurs in an underground cleaning plant, firefighters in evacuating workers and extinguishing the fire. The system disclosed in Patent Literature 1 includes a plant monitoring board, a video control board, a position monitoring board that specifies the current position of an essential personnel member (e.g., a firefighter) through communication between a PHS (Personal Handy phone System) carried by the essential personnel member and a base station, and a maintenance information terminal including a small camera and a display screen. Further, the system disclosed in Patent Literature 1 also includes a comprehensive disaster prevention display board that receives operation information of emergency equipment from the plant monitoring board and position information from the position monitoring board, and displays these information items on a CRT display unit together with layout information of the plant prepared in advance.

CITATION LIST

Patent Literature

Patent Literature 1: Japanese Unexamined Patent Application Publication No. 2005-115796

SUMMARY OF INVENTION

Technical Problem

In the technology disclosed in Patent Literature 1, the current position of the essential personnel member is specified through communication between the PHS carried by the essential personnel member and the base station provided in advance in the plant. In other words, in the technology disclosed in Patent Literature 1, it is not possible to specify the position of the essential personnel member (working entity) such as a firefighter unless the base station is installed in the site. Therefore, in the technology disclosed in Patent Literature 1, it is difficult to find the position of a working entity such as a firefighter unless the plant is provided with an infrastructure.

The present disclosure has been made in order to solve the above-described problem, and an object thereof is to provide a display control apparatus, a display system, a display method, and a program capable of finding the position of a working entity even when the site is not provided with an infrastructure.

Solution to Problem

A display control apparatus according to the present disclosure includes: position calculation means for calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and display control means for performing control so that position information indicating the position of at least one working entity is displayed on a mask attached to a worker who is the working entity.

Further, a display system according to the present disclosure includes: a plurality of detection apparatuses each of which is attached to a respective one of a plurality of working entities working in a site; a mask attached to a worker who is the working entity; and a display control apparatus, in which each of the plurality of detection apparatuses transmits and receives a radio wave to and from another detection apparatus, and thereby measures a distance to the other detection apparatus, the display control apparatus includes: position calculation means for calculating a position of each of the plurality of working entities relative to a reference point by using distance measurement result information indicating results of the measurements of the distances; and display control means for performing control so that position information indicating the position of at least one working entity is displayed on a mask attached to a worker who is the working entity, and the mask displays position information of the working entity according to control by the display control apparatus.

Further, a display method according to the present disclosure includes: calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and performing control so that position information indicating the position of at least one working entity is displayed on a mask attached to a worker who is the working entity.

Further, a program according to the present disclosure causes a computer to perform: a step of calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and a step of performing control so that position information indicating the position of at least one working entity is displayed on a mask attached to a worker who is the working entity.

Advantageous Effects of Invention

According to the present disclosure, it is possible to provide a display control apparatus, a display system, a display method, and a program capable of finding the position of a working entity even when the site is not provided with an infrastructure.

BRIEF DESCRIPTION OF DRAWINGS

FIG. 14 shows an example of a state in which divided areas are displayed on the position information display screen shown in FIG. 13;

FIG. 16 shows an example of a state in which no map information is displayed in the position information display screen shown in FIG. 14.

EXAMPLE EMBODIMENT

Outline of Example Embodiment According to Present Disclosure

Figure 1:
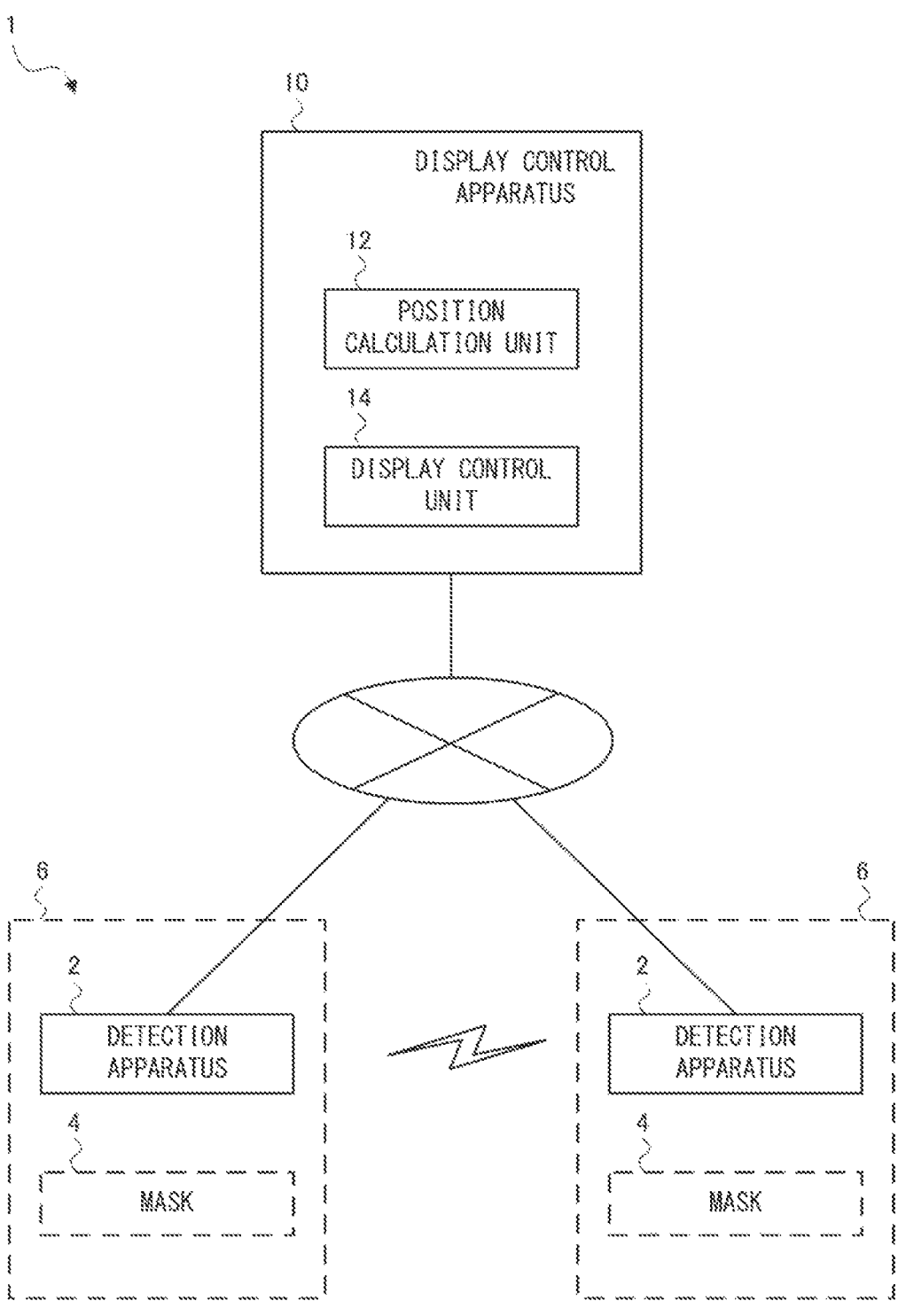
FIG. 1 shows an outline of a display system according to an example embodiment of the present disclosure.

Prior to describing an example embodiment according to the present disclosure in detail, an outline of the example embodiment according to the present disclosure will be described. FIG. 1 shows an outline of a display system 1 according to an example embodiment of the present disclosure.

The display system 1 includes a plurality of detection apparatuses 2, a mask 4, and a display control apparatus 10. The plurality of detection apparatuses 2 are worn by (or attached to) a plurality of working entities 6, respectively, who work in the site. Note that examples of the working entity include a worker and a non-human mobile object. Each of the plurality of detection apparatuses 2 transmits and receives radio waves to and from other detection apparatuses 2, and thereby measures distances to the other detection apparatuses 2.

The mask 4 is worn by (or attached to) a worker who is a working entity 6. Note that when the work site is, for example, a site of fire, the worker is, for example, a firefighter. However, the worker is not limited to the firefighter. The type of worker may vary as appropriate according to the type of work site. For example, the worker may be a police officer, a member of the SDF (Self-Defense Forces), a member of a rescue party, a worker in a construction site, a worker in a nuclear power plant, a worker in a warehouse, a worker in an airport, a worker in a mall, or the like. That is, the mask 4 according to this example embodiment may be worn by (or attached to) any of various kinds of workers. When appropriate, in the following description, an example in which the worker (working entity) is a firefighter will be described.

The display control apparatus 10 may be, for example, formed by a computer (information processing apparatus). The display control apparatus 10 may be connected to the detection apparatuses 2, for example, through a network so that they can communicate with each other. The display control apparatus 10 includes a position calculation unit 12 and a display control unit 14.

Figure 2:
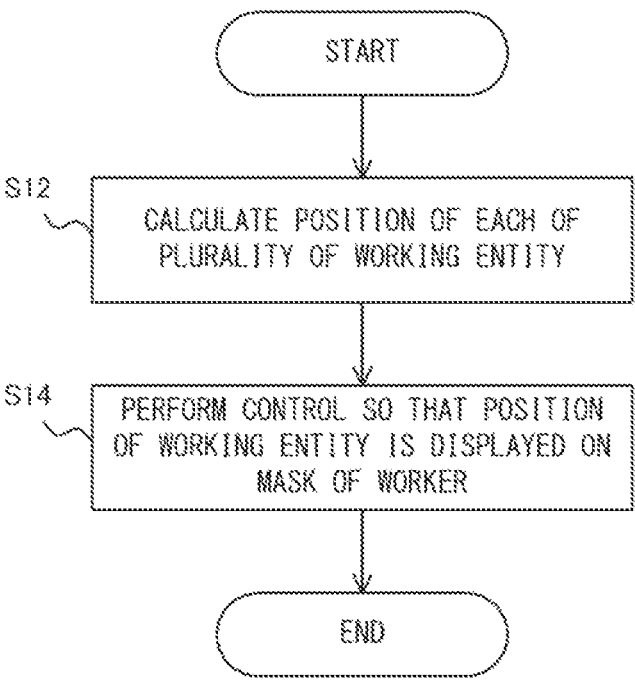
FIG. 2 is a flowchart showing a display method performed by a display control apparatus according to an example embodiment of the present disclosure.

FIG. 2 is a flowchart showing a display method performed by a display control apparatus 10 according to an example embodiment of the present disclosure. The position calculation unit 12 calculates the position of each of a plurality of working entities 6 relative to a reference point by using distance measurement result information indicating results of measurements of distances between the plurality of detection apparatuses 2 (Step S12). The position calculation unit 12 preferably calculates the respective positions of the plurality of working entities 6 relative to the reference point based on the relative positions of the plurality of detection apparatuses 2 relative to each other obtained by using distance measurement result information indicating results of measurements of distances between the plurality of detection apparatuses 2. The display control unit 14 performs control so that position information indicating the position of at least one working entity 6 is displayed on the mask 4 worn by the worker (Step S14). For example, the display control unit 14 performs control so that position information indicating the position of at least one working entity 6 including at least one worker is displayed on the mask 4 worn by the aforementioned worker. In this way, the position information of a working entity(s) 6 is displayed on the mask 4 worn by a worker.

In general, it is difficult for a leader (such as a captain of a fire brigade) who leads workers (members (e.g., member of a fire brigade), working entities) working in a site inside a building or the like from outside the building or the like to find the position(s) of a worker(s). Therefore, such a leader often finds the position of a member by using wirelessly-transmitted voice information or camera images or the like. However, when the visibility cannot be secured due to the collapse of the infrastructure or the occurrence of smoke, it is difficult to find the position of a member by using only the voice information and camera images. Further, a member himself/herself may not be able to find his/her position or those of other members when they are working in such a site. In this case, as mentioned above, it is difficult for the member himself/herself to find the position of himself/herself or those of other members by using only the voice information and camera images.

In the technology disclosed in Patent Literature 1, as described above, it is possible to find the position of an essential personnel member (e.g., a firefighter) inside a building by using a base station which is installed in advance in the building for the position determination. However, as described above, in the technology disclosed in Patent Literature 1, it is necessary to provide an infrastructure, such as the installation of a base station, in advance. Further, in the case of a disaster site or the like, there is a possibility that the infrastructure will be collapsed due to the collapse of the building or the like. Therefore, it is desirable if it is possible to find the position of a worker (working entity) even when the site or the like is not provided with an infrastructure for position determination.

The display system 1 (display control apparatus 10) according to this example embodiment is configured to calculate the position of each of a plurality of working entities 6 (workers or members (e.g., members of a fire brigade)) relative to a reference point by using results of measurements of distances between a plurality of detection apparatuses 2. Therefore, it is possible to specify the positions of working entities even when the site or the like is not provided with an infrastructure. Further, the display system 1 (display control apparatus 10) according to this example embodiment is configured to perform control so that position information indicating the position of at least one working entity 6 is displayed on the mask 4 worn by a worker. Therefore, a worker can find the position of a working entity(ies) even when the site or the like is not provided with an infrastructure. Further, by displaying the position information on a terminal for a leader, the leader can find the position of a working entity(ies) even when the site or the like is not provided with an infrastructure.

Further, since the position determination (positioning) is performed through the base station in the technology disclosed in Patent Literature 1, the response of the position determination may be delayed depending on the network environment, the processing capacity of the server, or the like. Note that since real-time performance is required in a disaster site or the like, the occurrence of a delay in the position determination of a member is undesirable. In contrast, in this example embodiment, since the position determination is performed without using an infrastructure such as a base station, the occurrence of a delay in the position determination can be prevented.

Meanwhile, there is an infrastructure-free indoor positioning technology in which the terrestrial magnetism is used. However, this technology requires an in-advance environmental survey, such as creating a geomagnetic map of the environment in advance, so that the technology is time-consuming. In contrast, in this example embodiment, the position of a member(s) is determined by using results of measurements of distances which are performed by transmitting and receiving radio waves between a plurality of detection apparatus worn by (or attached to) each of working entities, so that there is no need to make preparations in advance.

First Example Embodiment

An example embodiment will be described hereinafter with reference to the drawings. For clarifying the explanation, the following descriptions and drawings are partially omitted and simplified as appropriate. Further, the same reference numerals (or symbols) are assigned to the same components/structures throughout the drawings, and redundant descriptions thereof will be omitted as appropriate.

Figure 3:
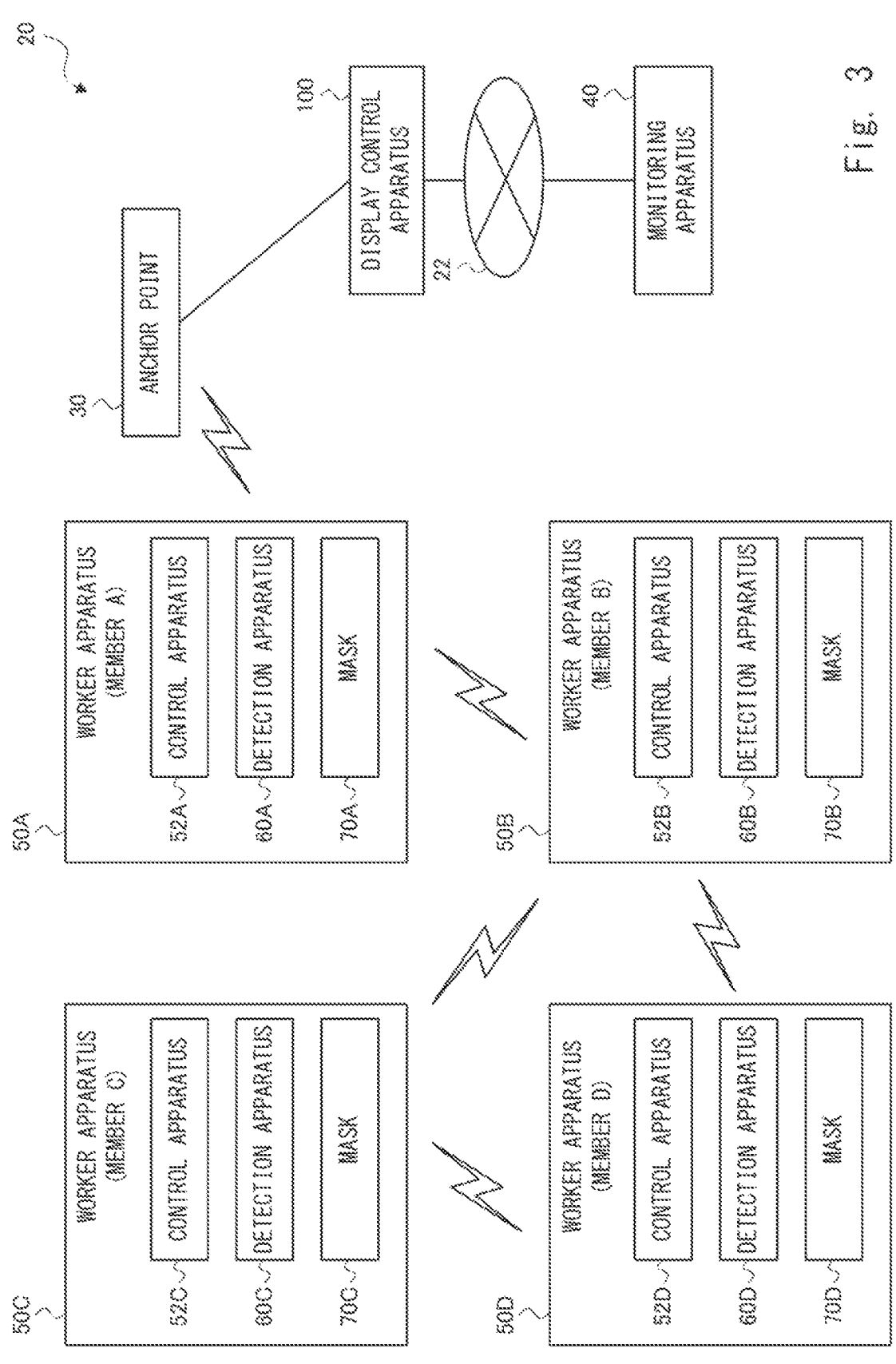
FIG. 3 shows a display system according to a first example embodiment.

FIG. 3 shows a display system 20 according to a first example embodiment. The display system 20 corresponds to the display system 1 shown in FIG. 1. The display system 20 includes an anchor point 30, a monitoring apparatus 40, a plurality of worker apparatuses 50, and a display control apparatus 100. Note that although four worker apparatuses 50A to 50D are shown in FIG. 3, the number of worker apparatuses 50 may be any number equal to or greater than two.

Each of the plurality of worker apparatuses 50 includes a control apparatus 52, a detection apparatus 60, and a mask 70. Note that the control apparatus 52, the detection apparatus 60, and the mask 70 may be physically separated from each other. The detection apparatus 60 corresponds to the detection apparatus 2 shown in FIG. 1. Further, the mask 70 corresponds to the mask 4 shown in FIG. 1. The worker apparatus 50 (the control apparatus 52, the detection apparatus 60, and the mask 70) is worn by (or attached to) a worker (member). The control apparatus 52 and the detection apparatus 60 are disposed at any place of the member (e.g., in a lower part of an air cylinder carried by the member). Further, the mask 70 is put on (or attached to) the head of the member.

Further, the worker apparatus 50A (the control apparatus 52A, the detection apparatus 60A, and the mask 70A) is attached to (or put on) a member A. Further, the worker apparatus 50B (the control apparatus 52B, the detection apparatus 60B, and the mask 70B) is attached to (or put on) a member B. Further, the worker apparatus 50C (the control apparatus 52C, the detection apparatus 60C, and the mask 70C) is attached to (or put on) a member C. Further, the worker apparatus 50D (the control apparatus 52D, the detection apparatus 60D, and the mask 70D) is attached to (or put on) a member D. That is, in the example shown in FIG. 3, four members A to D are working in the site.

The control apparatus 52 is, for example, a control box. The control apparatus 52 controls operations performed by the detection apparatus 60 and the mask 70. The control apparatus 52 may perform, when the detection apparatus 60 and the mask 70 communicate with display control apparatus 100, processing necessary for the communication. Further, the control apparatus 52 may communicate with the display control apparatus 100 when the detection apparatus 60 and the mask 70 have no communication function. Further, the control apparatus 52 generates a screen image for displaying information necessary for the worker to work. Further, the control apparatus 52 makes the mask 70 display the generated screen image. When doing so, the control apparatus 52 may communicate with the display control apparatus 100 and thereby makes the mask 70 display the screen image under the control by the display control apparatus 100.

As described above with reference to FIG. 1 and the like, each of the plurality of the detection apparatus 60 transmits and receives radio waves to and from the other detection apparatuses 60, and by doing so, measures distances to the other detection apparatuses 60. Specifically, the detection apparatus 60 transmits and receives radio waves (UWB (Ultra Wide Band) radio waves) generated by a UWB radio system to and from the other detection apparatuses 60. Note that although the communication range of the UWB radio system is short (a radius of about 10 m), it can be used for measuring distances. Therefore, the detection apparatus 60 measures distances to other nearby detection apparatuses 60. For example, the detection apparatus 60A measures a distance to the detection apparatus 60B by transmitting and receiving radio waves to and from the detection apparatus 60B.

The mask 70 includes an air mask and a transparent window (face shield). Further, the mask 70 (or the detection apparatus 60) may include a gas sensor and a temperature sensor. Further, the mask 70 functions as a smart mask. That is, the mask 70 displays necessary information in such a manner that the member (i.e., the member wearing the mask) can view the displayed information. Further, as described above with reference to FIG. 1 and the like, the mask 70 displays the position information of a member (worker, i.e., working entity). When doing so, the mask 70 displays the position information of the member (worker, i.e., working entity) under the control by the display control apparatus 100 as described later. The detection apparatus 60 and the mask 70 will be described later.

The display control apparatus 100 corresponds to the display control apparatus 10 shown in FIG. 1. The display control apparatus 100 is, for example, a computer such as a personal computer or a server. The display control apparatus 100 is connected to the anchor point 30 and the monitoring apparatus 40 through a wire or wirelessly so that they can communicate with each other. The display control apparatus 10 is connected to the monitoring apparatus 40, for example, through a network 22 such as WLAN (Wireless Local Area Network) so that they can communicate with each other.

Further, the display control apparatus 100 is wirelessly connected to the worker apparatus 50 (the control apparatus 52, the detection apparatus 60, and the mask 70) so that they can communicate with each other. Specifically, the display control apparatus 100 is connected to the worker apparatus 50 through a radio communication technology capable of performing long-distance communication (transmission of signals of several kilometers to several tens of kilometers), such as LPWA (Low Power Wide Area) so that they can communicate with each other.

Similarly to the above-described display control apparatus 10, the display control apparatus 100 calculates the position of each of a plurality of members relative to a reference point based on relative positions of a plurality of detection apparatuses 60 relative to each other obtained by using distance measurement result information indicating results of measurements of distances between the plurality of detection apparatuses 60. Further, the display control apparatus 100 performs control to make the mask 70 display position information indicating the position of a member. Further, the display control apparatus 100 performs control to make the monitoring apparatus 40 display position information of a member. Details of these features will be described later.

The anchor point 30 serves as a reference point when the position determination (positioning) of the members A to D (workers, i.e., working entities) is performed. That is, the positions of the members A to D are calculated by using the anchor point 30 as a reference point. In other words, when the positions of the members A to D are determined, the absolute positions of the members A to D in the coordinate system (coordinate space) in which the position of the anchor point 30 is defined as the origin are calculated. The anchor point 30 is installed by a member, for example, near the entrance of the site.

The anchor point 30 is, for example, a UWB anchor. The anchor point 30 transmits and receives radio waves to and from nearby detection apparatuses 60, and thereby measures the distances to the detection apparatuses 60. Specifically, the anchor point 30 transmits and receives UWB radio waves to and from nearby detection apparatuses 60. In this way, the detection apparatus 60 measures distances to the nearby detection apparatuses 60. For example, the anchor point 30 measures the distance between the anchor point 30 and the nearby detection apparatus 60A by transmitting and receiving radio waves to and from the nearby detection apparatus 60A.

The monitoring apparatus 40 is operated by a leader (captain) of members (e.g., a captain of members of a fire brigade). The monitoring apparatus 40 may be located at a place away from the site. The monitoring apparatus 40 may be, for example, a notebook computer or a tablet-type terminal. As will be described later, the monitoring apparatus 40 displays position information of a member (worker, i.e., working entity) under the control by the display control apparatus 100. Further, in addition to the position information, the monitoring apparatus 40 can display an activity status (a working status) of a member. Details of a screen image displayed by the monitoring apparatus 40 will be described later.

Further, the monitoring apparatus 40 generates a message according to an operation performed by the leader. The generated message is transmitted by the display control apparatus 100 to the worker apparatus 50 (the control apparatus 52 or the mask 70). In this way, the mask 70 displays the message in such a manner that the worker can view the displayed message as described later.

Figure 4:
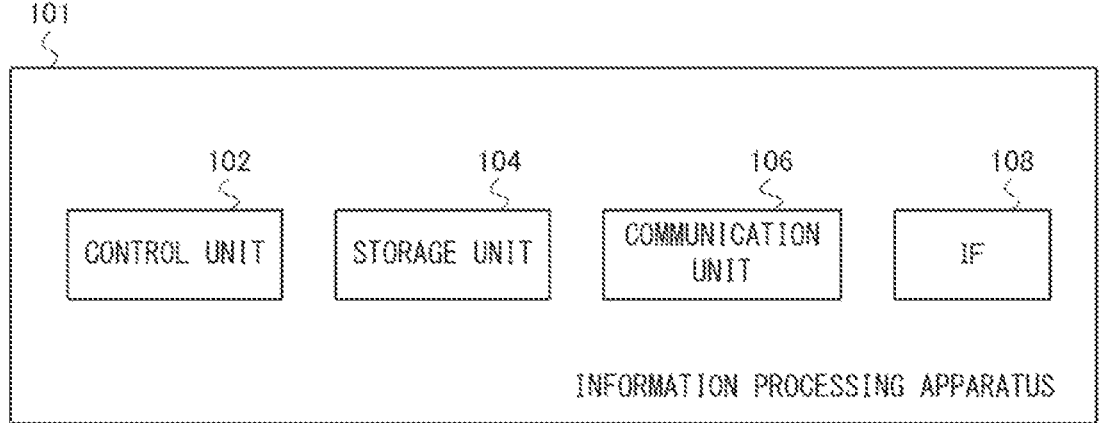
FIG. 4 shows a hardware configuration of an information processing apparatus installed in an apparatus according to the first example embodiment.

FIG. 4 shows a hardware configuration of an information processing apparatus 101 installed in an apparatus according to the first example embodiment. The information processing apparatus 101 functions as a computer. The information processing apparatus 101 can be installed in the display control apparatus 100, the monitoring apparatus 40, and the worker apparatus 50 (the control apparatus 52, the detection apparatus 60, and the mask 70).

The information processing apparatus 101 includes, as its main hardware configuration, a control unit 102, a storage unit 104, a communication unit 106, and an interface (IF) unit 108. The control unit 102, the storage unit 104, the communication unit 106, and the interface unit 108 are connected to each other through a data bus or the like.

The control unit 102 is, for example, a processor such as a CPU (Central Processing Unit). The control unit 102 functions as an arithmetic apparatus that performs control processing, arithmetic processing, and the like. The storage unit 104 is a storage device such as a memory or a hard disk drive. The storage unit 104 is, for example, a ROM (Read Only Memory) or a RAM (Random Access Memory). The storage unit 104 has a function for storing a control program(s), an arithmetic program(s), and the like that are executed by the control unit 102. Further, the storage unit 104 has a function for temporarily storing processing data and the like. The storage unit 104 may include a database.

The communication unit 106 performs processing necessary to communicate with other apparatuses. The communication unit 106 may include communication ports, a router, a firewall, and the like. The interface unit 108 is, for example, a user interface (UI). The interface unit 108 includes an input device such as a keyboard, a touch panel, or a mouse, and an output device such as a display or a speaker. The interface unit 108 receives an operation for entering data performed by a user and outputs information for the user.

Figure 5:
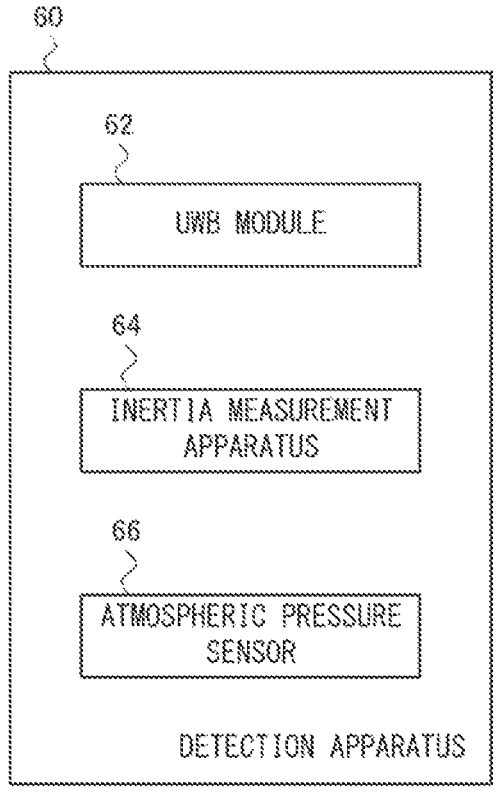
FIG. 5 shows a configuration of a detection apparatus according to the first example embodiment.

FIG. 5 shows a configuration of the detection apparatus 60 according to the first example embodiment. The detection apparatus 60 includes a UWB module 62, an inertia measurement device 64, and an atmospheric pressure sensor 66. Note that the UWB module 62, the inertia measurement device 64, and the atmospheric pressure sensor 66 may be physically separated from each other.

The UWB module 62 transmits UWB radio waves to a nearby detection apparatus(es) 60. Further, the UWB module 62 receives UWB radio waves transmitted from a nearby detection apparatus(es) 60. In this way, the UWB module 62 measures (estimates) the distance(s) to the nearby detection apparatus(es) 60. Specifically, the UWB module 62 measures the distance to a nearby detection apparatus 60 by measuring the propagation time of a pulse of UWB radio waves to the nearby detection apparatus 60 by a TOA (Time Of Arrival) technology. The UWB module 62 (detection apparatus 60) generates distance measurement result information including distance information indicating the distance(s) to the nearby detection apparatus(es) 60 and identification information of the nearby detection apparatus(s) 60. Note that the anchor point 30 may have a function similar to that of the UWB module 62. Further, the distance measurement result information may include information indicating the direction of radio waves of the UWB module 62. That is, the distance measurement result information may indicate the direction of radio waves that the UWB module 62 transmits to a UWB module 62 of another detection apparatus 60, or the direction of radio waves that the UWB module 62 receives from a UWB module 62 of another detection apparatus 60.

The inertia measurement device 64 is, for example, an IMU (Internal Measurement Unit). The inertia measurement device 64 includes, for example, an acceleration sensor, a gyroscopic sensor, and the like. The inertia measurement device 64 detects the posture of a member, or the direction in which a member is facing by measuring the angular velocity and acceleration of the member. The inertia measurement device 64 generates IMU information indicating a result of the detection.

The atmospheric pressure sensor 66 measures an atmospheric pressure in a surrounding environment. The atmospheric pressure sensor 66 generates atmospheric pressure information which is the result of the measurement. Note that as described later, the floor level of the place where the member is located can be specified (estimated) by using the atmospheric pressure information.

The control apparatus 52 transmits detection information generated by the detection apparatus 60 to the display control apparatus 100. In other words, the detection apparatus 60 transmits the detection information to the display control apparatus 100 through the control apparatus 52. Note that when the detection apparatus 60 has a communication function, the detection apparatus 60 may transmit the detection information to the display control apparatus 100. Note that the detection information includes distance measurement result information, IMU information, and atmospheric pressure information. The control apparatus 52 (or the detection apparatus 60) transmits detection information to the display control apparatus 100 by a long-distance communication technology such as LPWA. Further, the control apparatus 52 generates a screen image displayed on a head-up display 74 (which will be described later) under the control by the display control apparatus 100.

Figure 6:
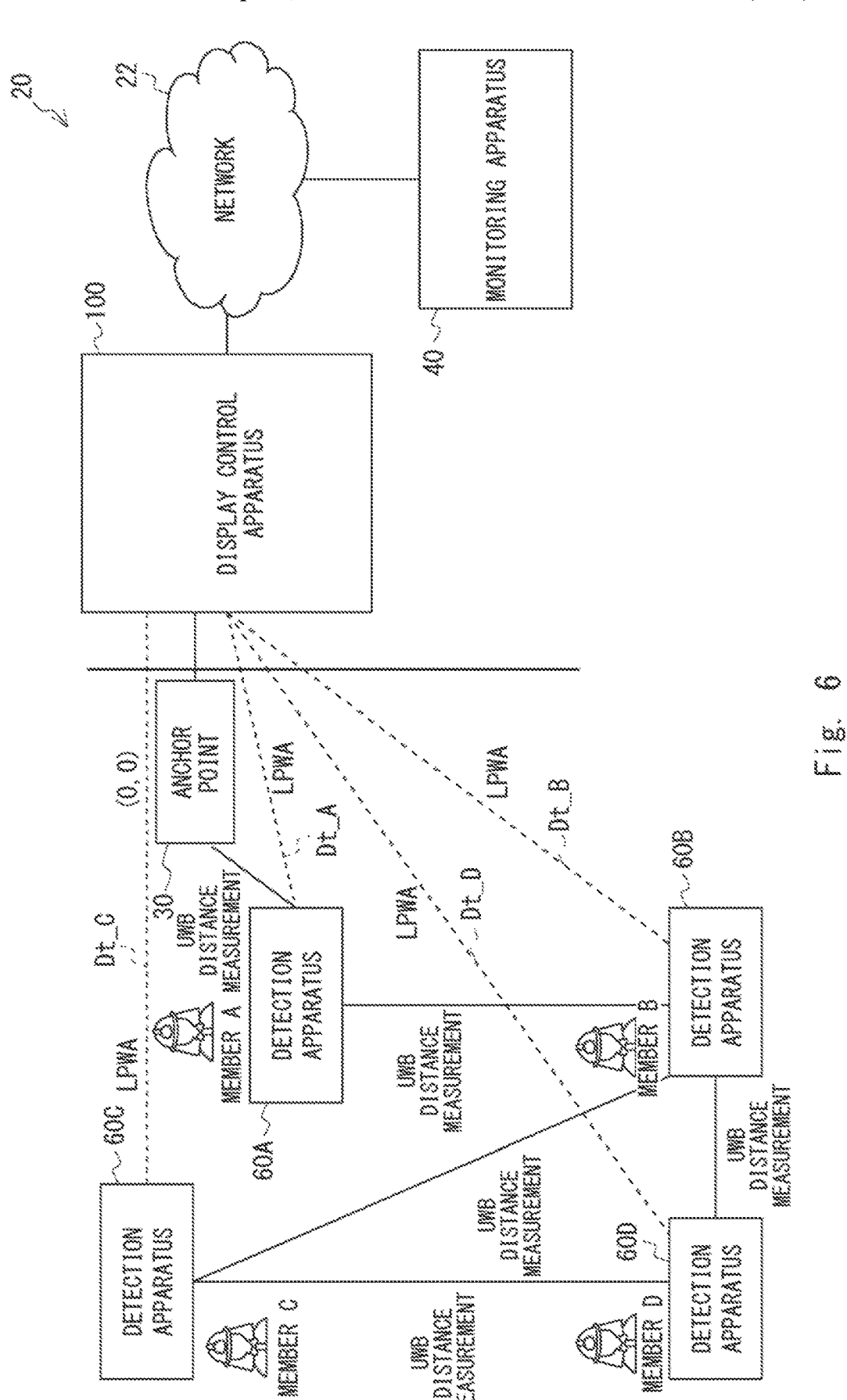
FIG. 6 is a diagram for explaining measurements of distances between detection apparatuses in the display system according to the first example embodiment.

FIG. 6 is a diagram for explaining measurements of distances between detection apparatuses 60 in the display system 20 according to the first example embodiment. Note that since the anchor point 30 serves as a reference point, it corresponds to the origin (0, 0) in the XY-coordinate system.

When the UWB module of the anchor point 30 transmits UWB radio waves to the nearby detection apparatus 60A (transmits and receives UWB radio waves to and from the nearby detection apparatus 60A), the anchor point 30 (UWB module) measures the distance to the detection apparatus 60A. Note that "nearby" means that the detection apparatus or the like is sufficiently close to the anchor point 30 (e.g., about 10 m to 20 m from the anchor point 30) so that UWB radio waves reach the detection apparatus or the like. Then, the anchor point 30 (UWB module) generates distance measurement result information "An->A" including distance information indicating the distance to the detection apparatus 60A and identification information of the detection apparatus 60A (member A). Note that the anchor point 30 may acquire the identification information of the detection apparatus 60A (member A) by receiving UWB radio waves indicating the identification information of the detection apparatus 60A (member A) from the detection apparatus 60A. Further, the anchor point 30 may acquire the distance information indicating the distance to the detection apparatus 60A by receiving UWB radio waves indicating the distance to the detection apparatus 60A from the detection apparatus 60A.

Similarly, when the UWB module 62 of the detection apparatus 60A transmits UWB radio waves to the nearby anchor point 30 (transmits and receives UWB radio waves to and from the nearby anchor point 30), the UWB module 62 of the detection apparatus 60A measures the distance to the anchor point 30. Then, the UWB module 62 of the detection apparatus 60A generates distance measurement result information "A-> An" including distance information indicating the distance to the anchor point 30 and identification information of the anchor point 30. Note that the detection apparatus 60A may acquire the identification information of the anchor point 30 by receiving UWB radio waves indicating the identification information of the anchor point 30 from the anchor point 30. Further, the detection apparatus 60A may acquire the distance information indicating the distance to the anchor point 30 by receiving UWB radio waves indicating the distance to the anchor point 30 from the anchor point 30. Note that the distance information indicated by the distance measurement result information "A-> An" may be roughly (substantially) the same as the distance information indicated by the distance measurement result information "An->A".

Further, when the UWB module 62 of the detection apparatus 60A transmits UWB radio waves to the nearby detection apparatus 60B (transmits and receives UWB radio waves to and from the nearby detection apparatus 60B), the UWB module 62 of the detection apparatus 60A measures the distance to the detection apparatus 60B. Then, the UWB module 62 of the detection apparatus 60A generates distance measurement result information "A->B" including distance information indicating the distance to the detection apparatus 60B and identification information of the detection apparatus 60B (member B). Note that the detection apparatus 60A may acquire the identification information of the detection apparatus 60B (member B) by receiving UWB radio waves indicating the identification information of the detection apparatus 60B (member B) from the detection apparatus 60B. Further, the detection apparatus 60A may acquire the distance information indicating the distance to the detection apparatus 60B by receiving UWB radio waves indicating the distance to the detection apparatus 60B from the detection apparatus 60B.

Similarly, when the UWB module 62 of the detection apparatus 60B transmits UWB radio waves to the nearby detection apparatus 60A (transmits and receives UWB radio waves to and from the nearby detection apparatus 60A), the UWB module 62 of the detection apparatus 60B measures the distance to the detection apparatus 60A. Then, the UWB module 62 of the detection apparatus 60B generates distance measurement result information "B->A" including distance information indicating the distance to the detection apparatus 60A and identification information of the detection apparatus 60A (member A). Note that the detection apparatus 60B may acquire the identification information of the detection apparatus 60A (member A) by receiving UWB radio waves indicating the identification information of the detection apparatus 60A (member A) from the detection apparatus 60A. Further, the detection apparatus 60B may acquire the distance information indicating the distance to the detection apparatus 60A by receiving UWB radio waves indicating the distance to the detection apparatus 60A from the detection apparatus 60A. Note that the distance information indicated by the distance measurement result information "B->A" may be roughly (substantially) the same as the distance information indicated by the distance measurement result information "A->B".

Further, when the UWB module 62 of the detection apparatus 60B transmits UWB radio waves to the nearby detection apparatus 60C (transmits and receives UWB radio waves to and from the nearby detection apparatus 60C), the UWB module 62 of the detection apparatus 60B measures the distance to the detection apparatus 60C. Then, the UWB module 62 of the detection apparatus 60B generates distance measurement result information "B->C" including distance information indicating the distance to the detection apparatus 60C and identification information of the detection apparatus 60C (member C). Note that the detection apparatus 60B may acquire the identification information of the detection apparatus 60C (member C) by receiving UWB radio waves indicating the identification information of the detection apparatus 60C (member C) from the detection apparatus 60C. Further, the detection apparatus 60B may acquire the distance information indicating the distance to the detection apparatus 60C by receiving UWB radio waves indicating the distance to the detection apparatus 60C from the detection apparatus 60C.

Similarly, when the UWB module 62 of the detection apparatus 60C transmits UWB radio waves to the nearby detection apparatus 60B (transmits and receives UWB radio waves to and from the nearby detection apparatus 60B), the UWB module 62 of the detection apparatus 60C measures the distance to the detection apparatus 60B. Then, the UWB module 62 of the detection apparatus 60C generates distance measurement result information "C->B" including distance information indicating the distance to the detection apparatus 60B and identification information of the detection apparatus 60B (member B). Note that the detection apparatus 60C may acquire the identification information of the detection apparatus 60B (member B) by receiving UWB radio waves indicating the identification information of the detection apparatus 60B (member B) from the detection apparatus 60B. Further, the detection apparatus 60C may acquire the distance information indicating the distance to the detection apparatus 60B by receiving UWB radio waves indicating the distance to the detection apparatus 60B from the detection apparatus 60B. Note that the distance information indicated by the distance measurement result information "C->B" may be roughly (substantially) the same as the distance information indicated by the distance measurement result information "B->C".

Further, when the UWB module 62 of the detection apparatus 60B transmits UWB radio waves to the nearby detection apparatus 60D (transmits and receives UWB radio waves to and from the nearby detection apparatus 60D), the UWB module 62 of the detection apparatus 60B measures the distance to the detection apparatus 60D. Then, the UWB module 62 of the detection apparatus 60B generates distance measurement result information "B->D" including distance information indicating the distance to the detection apparatus 60D and identification information of the detection apparatus 60D (member D). Note that the detection apparatus 60B may acquire the identification information of the detection apparatus 60D (member D) by receiving UWB radio waves indicating the identification information of the detection apparatus 60D (member D) from the detection apparatus 60D. Further, the detection apparatus 60B may acquire the distance information indicating the distance to the detection apparatus 60D by receiving UWB radio waves indicating the distance to the detection apparatus 60D from the detection apparatus 60D.

Similarly, when the UWB module 62 of the detection apparatus 60D transmits UWB radio waves to the nearby detection apparatus 60B (transmits and receives UWB radio waves to and from the nearby detection apparatus 60B), the UWB module 62 of the detection apparatus 60D measures the distance to the detection apparatus 60B. Then, the UWB module 62 of the detection apparatus 60D generates distance measurement result information "D->B" including distance information indicating the distance to the detection apparatus 60B and identification information of the detection apparatus 60B (member B). Note that the detection apparatus 60D may acquire the identification information of the detection apparatus 60B (member B) by receiving UWB radio waves indicating the identification information of the detection apparatus 60B (member B) from the detection apparatus 60B. Further, the detection apparatus 60D may acquire the distance information indicating the distance to the detection apparatus 60B by receiving UWB radio waves indicating the distance to the detection apparatus 60B from the detection apparatus 60B. Note that the distance information indicated by the distance measurement result information "D->B" may be roughly (substantially) the same as the distance information indicated by the distance measurement result information "B->D".

Further, when the UWB module 62 of the detection apparatus 60C transmits UWB radio waves to the nearby detection apparatus 60D (transmits and receives UWB radio waves to and from the nearby detection apparatus 60D), the UWB module 62 of the detection apparatus 60C measures the distance to the detection apparatus 60D. Then, the UWB module 62 of the detection apparatus 60C generates distance measurement result information "C->D" including distance information indicating the distance to the detection apparatus 60D and identification information of the detection apparatus 60D (member D). Note that the detection apparatus 60C may acquire the identification information of the detection apparatus 60D (member D) by receiving UWB radio waves indicating the identification information of the detection apparatus 60D (member D) from the detection apparatus 60D. Further, the detection apparatus 60C may acquire the distance information indicating the distance to the detection apparatus 60D by receiving UWB radio waves indicating the distance to the detection apparatus 60D from the detection apparatus 60D.

Similarly, when the UWB module 62 of the detection apparatus 60D transmits UWB radio waves to the nearby detection apparatus 60C (transmits and receives UWB radio waves to and from the nearby detection apparatus 60C), the UWB module 62 of the detection apparatus 60D measures the distance to the detection apparatus 60C. Then, the UWB module 62 of the detection apparatus 60D generates distance measurement result information "D->C" including distance information indicating the distance to the detection apparatus 60C and identification information of the detection apparatus 60C (member C). Note that the detection apparatus 60D may acquire the identification information of the detection apparatus 60C (member C) by receiving UWB radio waves indicating the identification information of the detection apparatus 60C (member C) from the detection apparatus 60C. Further, the detection apparatus 60D may acquire the distance information indicating the distance to the detection apparatus 60C by receiving UWB radio waves indicating the distance to the detection apparatus 60C from the detection apparatus 60C. Note that the distance information indicated by the distance measurement result information "D->C" can be roughly (substantially) the same as the distance information indicated by the distance measurement result information "C->D".

The inertia measurement device 64 of the detection apparatus 60A detects IMU indicating the direction in which the member A is facing and thereby generates IMU information. Further, the atmospheric pressure sensor 66 of the detection apparatus 60A measures an atmospheric pressure in the environment around the member A and thereby generates atmospheric pressure information. Then, the detection apparatus 60A transmits detection information Dt_A including the obtained distance measurement result information, the obtained IMU information, and the obtained atmospheric pressure information to the display control apparatus 100, for example, by LPWA or the like.

The inertia measurement device 64 of the detection apparatus 60B detects IMU indicating the direction in which the member B is facing and thereby generates IMU information. Further, the atmospheric pressure sensor 66 of the detection apparatus 60B measures an atmospheric pressure in the environment around the member B and thereby generates atmospheric pressure information. Then, the detection apparatus 60B transmits detection information Dt_B including the obtained distance measurement result information, the obtained IMU information, and the obtained atmospheric pressure information to the display control apparatus 100, for example, by LPWA or the like.

The inertia measurement device 64 of the detection apparatus 60C detects IMU indicating the direction in which the member C is facing and thereby generates IMU information. Further, the atmospheric pressure sensor 66 of the detection apparatus 60C measures an atmospheric pressure in the environment around the member C and thereby generates atmospheric pressure information. Then, the detection apparatus 60C transmits detection information Dt_C including the obtained distance measurement result information, the obtained IMU information, and the obtained atmospheric pressure information to the display control apparatus 100, for example, by LPWA or the like.

The inertia measurement device 64 of the detection apparatus 60D detects IMU indicating the direction in which the member D is facing and thereby generates IMU information. Further, the atmospheric pressure sensor 66 of the detection apparatus 60D measures an atmospheric pressure in the environment around the member D and thereby generates atmospheric pressure information. Then, the detection apparatus 60D transmits detection information Dt_D including the obtained distance measurement result information, the obtained IMU information, and the obtained atmospheric pressure information to the display control apparatus 100, for example, by LPWA or the like.

Figure 7:
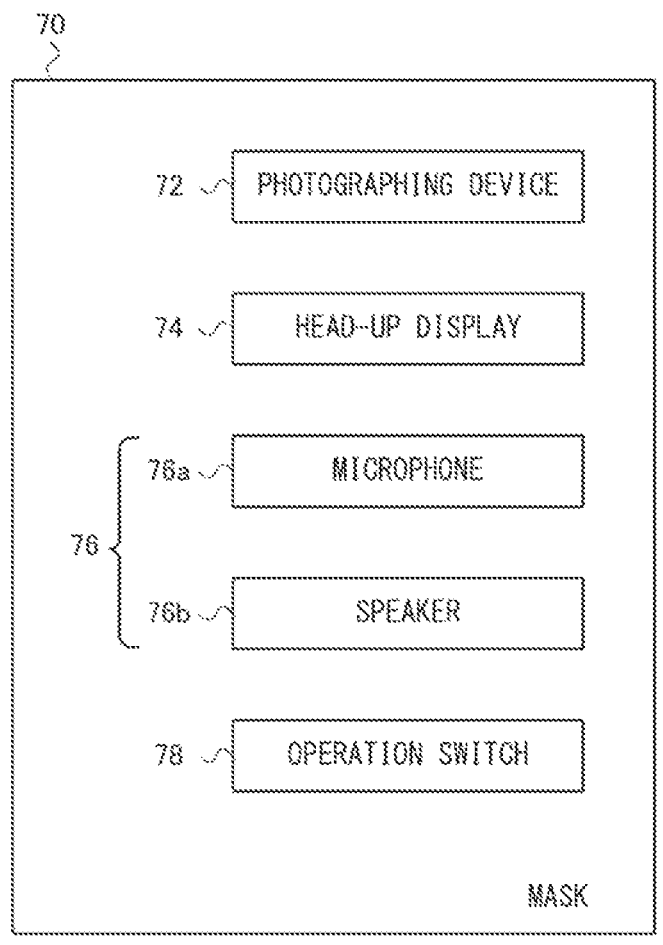
FIG. 7 shows a configuration of a mask according to the first example embodiment.
Figure 8:
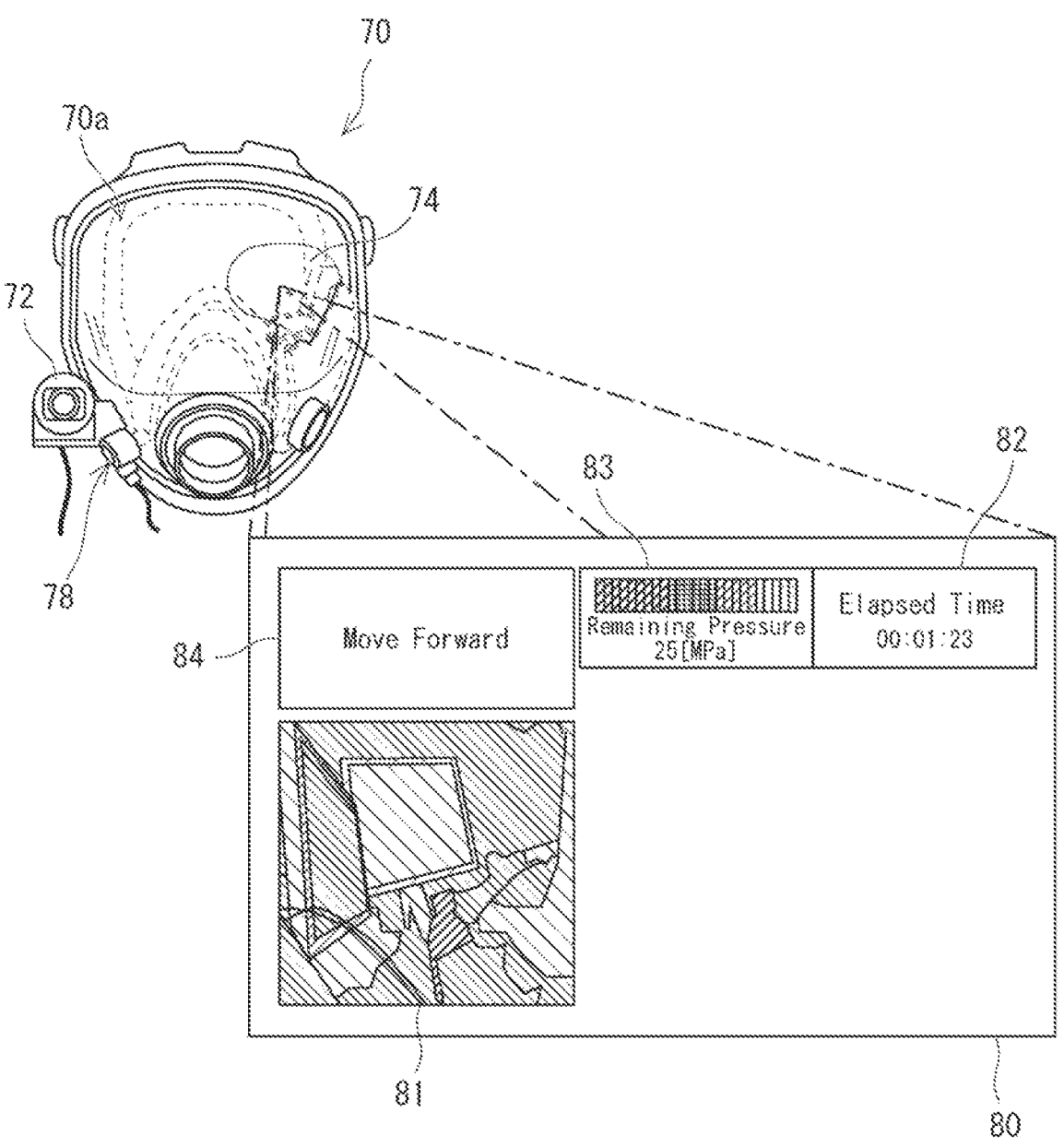
FIG. 8 shows a configuration of a mask according to the first example embodiment.

FIGS. 7 and 8 show configurations of the mask 70 according to the first example embodiment. The mask 70 includes a photographing device 72, a head-up display (HUD: Head-Up Display) 74, a voice input/output device 76, and an operation switch 78. The voice input/output device 76 includes a microphone 76a and a speaker 76b.

The photographing device 72 may have, for example, at least one of functions of an infrared camera and a visible-light camera. The photographing device 72 photographs the surrounding environment such as the front of the member (worker) wearing the mask 70. The photographing device 72 generates a photographed image (a moving image or a still image). Note that the photographing device 72, which is an infrared camera, can be used, for example, in a site under a dark environment. The photographing device 72, which is a visible-light camera, can be used, for example, in a site under a bright environment.

The head-up display 74 displays information necessary for the member (worker) wearing the mask 70 to work in such a manner that the member (worker) can view the displayed information. Therefore, the head-up display 74 displays a member screen image (or a member window) 80 indicating information necessary for the member to work. Further, as shown in FIG. 8, the head-up display 74 displays an imaginary image of the member screen image 80 in front of the member (worker) wearing the mask 70. Note that in the example shown in FIG. 8, the front surface of the mask 70 and the member screen image 80, which is an imaginary image, face the same direction (toward the front of the paper) for the sake of explanation. However, in practice, the member screen image 80, which is an imaginary image, is displayed so that the member screen image 80 faces the front surface of the mask 70 (i.e., is displayed opposite to the front surface of the mask 70).

Specifically, the head-up display 74 may include a reflective translucent member such as a combiner. Further, a screen image generated by the control apparatus 52 (control unit 102) of the worker apparatus 50 may be projected onto the combiner by using a known optical system. This projected screen image is reflected (and enlarged) by the combiner, and reaches the eyes of the member wearing the mask 70. In this way, the member wearing the mask 70 views the screen image as an imaginary image (i.e., a virtual image) that is enlarged and floats (i.e., appears) in front of (e.g., 1.5 m in front of) the member. As a result, the image (imaginary image) overlaps with the field of view of the member wearing the mask 70, so the member can view the image (imaginary image) substantially without moving his/her line of sight. Note that since a known optical system can be used for the one for projecting an imaginary image (i.e., virtual image), the description thereof is omitted. Note that the head-up display 74 may display the imaginary image (i.e., virtual image) in any part of the transparent window 70a of the mask 70 by projecting the imaginary image in that part.

As shown as an example in FIG. 8, the member screen image 80 displayed as an imaginary image (i.e., virtual image) includes a photographed image display area 81, an entry elapsed time display area 82, an air cylinder remaining pressure display area 83, and a message display area 84. In the photographed image display area 81, an image taken by the photographing device 72 provided in the mask 70 worn by himself/herself or worn by another member is displayed. That is, in the photographed image display area 81, an image taken by the photographing device 72 provided in the mask 70 (the own mask 70) on which the member screen image 80 is displayed, or an image taken by the photographing device 72 provided in the mask 70 of another member is displayed. Note that when an image taken by the photographing device 72 provided in the mask 70 of any of other members is displayed, identification information, a name, position information, shooting time information, and the like of that member may also be displayed. In this case, the position information may be information indicating a roughly-estimated position of the member. In the entry elapsed time display area 82, an elapsed time from when the member entered the site such as a fire site is displayed. In the air cylinder remaining pressure display area 83, a remaining amount (remaining pressure) of an air cylinder carried by (e.g., carried on the back of) the member is displayed. In the message display area 84, a message that the captain (leader) has generated by operating the monitoring apparatus 40, or a message automatically generated according to the situation or the like in the site is displayed. For example, in the message display area 84, a message generated by the display control apparatus 100 is displayed.

The voice input/output device 76 inputs and outputs voices or the like. The voice input/output device 76 preferably inputs and outputs voices or the like through bone conduction. The microphone 76a generates voice information (member voice information) representing voices of the member wearing the mask 70 by receiving voices uttered or spoken by the member. The generated member voice information is transmitted by the control apparatus 52 to the display control apparatus 100 (or the monitoring apparatus 40 or the radio terminal of the captain). The microphone 76a is preferably a bone conduction type microphone that receives voices through bone conduction.

The speaker 76b outputs voices of the captain or the like so that the member wearing the mask 70 can hear the output voices. Note that the voice information representing voices of the captain or the like (captain voice information) may be generated by the monitoring apparatus 40 (or the radio terminal of the captain) and transmitted by the display control apparatus 100 (or the monitoring apparatus 40 or the radio terminal of the captain) to the control apparatus 52 (or the mask 70). Note that the speaker 76b is preferably a bone conduction type speaker that outputs voices through bone conduction.

When a member is wearing a mask, wirelessly-transmitted voices may not be heard by the member in a noisy site. Therefore, there is a possibility that the member and the captain cannot talk with each other through voices. To cope with this, the voice input/output device 76 according to this example embodiment inputs and outputs voices through bone conduction. In this way, the member and the captain can talk with each other through voices.

The operation switch 78 is operated by the member. The operation switch 78 is, for example, a push-button type switch. The operation switch 78 may be used to switch the display mode on the screen that the member wearing the mask 70 views. For example, when the operation switch 78 is depressed once, images to be displayed in the entry elapsed time display area 82, the air cylinder remaining pressure display area 83, and the message display area 84 may be displayed in the respective areas. Further, when the operation switch 78 is depressed twice, images to be displayed in the photographed image display area 81 and the message display area 84 may be displayed in the respective areas. Further, when the operation switch 78 is depressed three times, the position information of the member may be displayed. Further, when the operation switch 78 is held down (i.e., is kept pressed down for a while), an emergency message for reporting an abnormality of the member may be issued.

Figure 9:
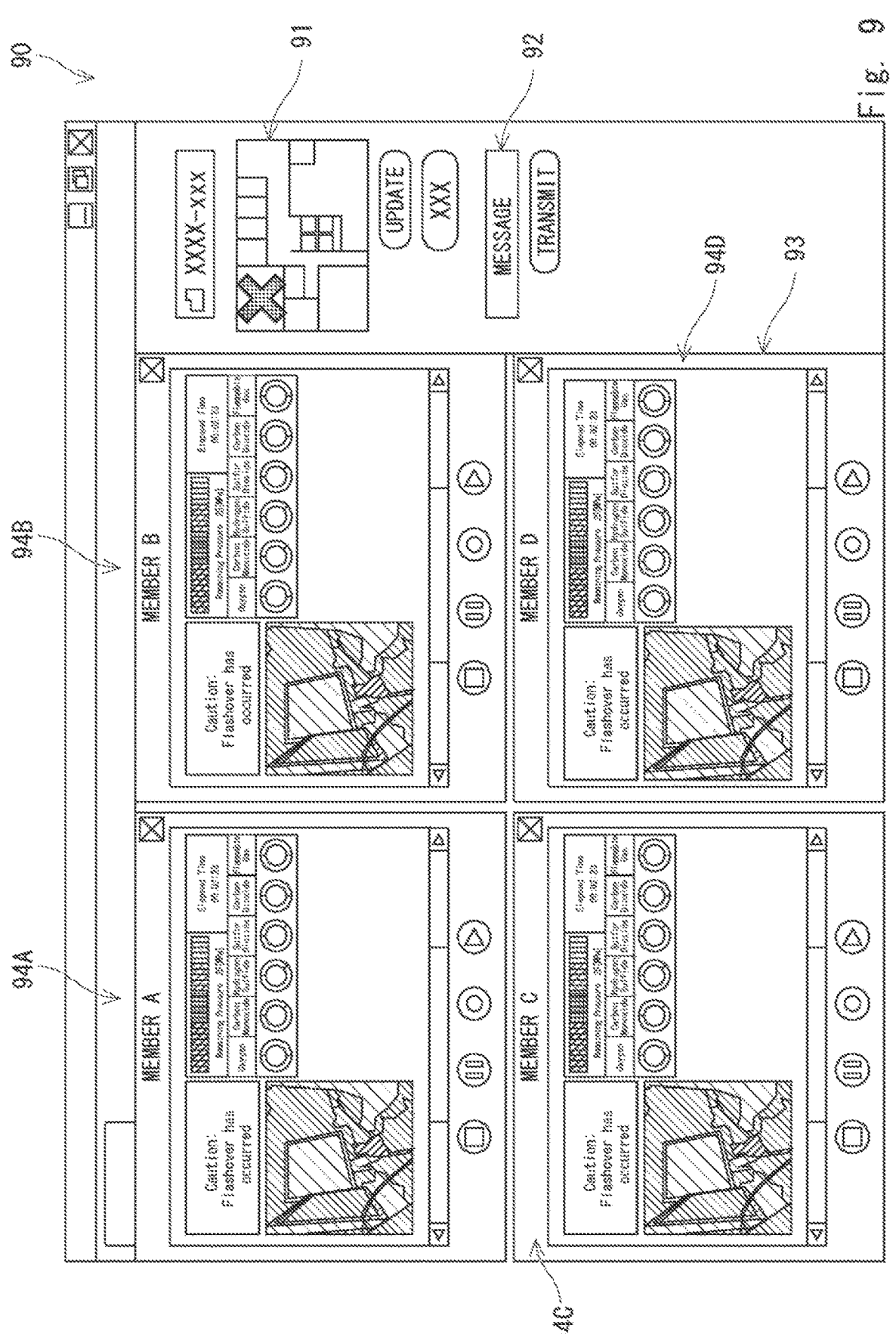
FIG. 9 shows an example of a captain screen displayed by a monitoring apparatus according to the first example embodiment.

FIG. 9 shows an example of a captain screen image (or a captain window) 90 displayed by the monitoring apparatus 40 according to the first example embodiment. The captain screen image 90 is displayed on a display (interface unit 108) of the monitoring apparatus 40. As shown as an example in FIG. 9, for example, the captain screen image 90 includes a map display area 91, a message transmission area 92, and an activity status display area 93.

In the map display area 91, for example, map information of a site such as a disaster site is displayed. The map information is, for example, a map of the site or a floor map of a building which is the site. Further, the map information may be a photograph (aerial photograph or the like) of the site.

In the message transmission area 92, for example, a message (e.g., an urgent message) that the captain transmits to a member(s) is displayed. The captain generates a message by operating the monitoring apparatus 40, and the generated message is displayed in the message transmission area 92. Further, the captain can also transmit a message by operating a transmission button displayed in the message transmission area 92 through a graphical user interface (GUI: Graphical User Interface). In this case, message information indicating the message is transmitted to the display control apparatus 100, and the display control apparatus 100 performs control so that the message is displayed on the mask 70 (in the message display area 84). As a result, the message is displayed in the message display area 84 of the member screen image 80.

In the activity status display area 93, an activity status of each member is displayed. In the example shown in FIG. 9, in the activity status display area 93, an activity status image 94A indicating an activity status of the member A, an activity status image 94B indicating an activity status of the member B, an activity status image 94C indicating an activity status of the member C, and an activity status image 94D indicating an activity status of the member D are displayed.

Regarding each of the activity status images 94, the same image as that displayed by the mask 70 (in the member screen image 80 of the mask 70) worn by the corresponding member may be displayed. Further, each of the activity status images 94 includes a photographed image taken by the photographing device 72 of the mask 70 worn by the corresponding member may be displayed. Further, in the activity status display area 93 (each of the activity status images 94), personal information (a name, a blood type, etc.) of the member may be displayed. Further, by operating the captain screen image 90 through the GUI, it is possible to select any of the members and record his/her activity status image 94 in order to reflect on (i.e., examine) the situation later. Further, a photographed image included in the activity status image 94 may be zoomed in or out by operating the captain screen image 90 through the GUI.

Further, the monitoring apparatus 40 enables the captain to select information to be displayed on the mask 70 of each member, for example, by operating the captain screen image 90 through the GUI. Further, the captain may select, by operating the monitoring apparatus 40, a member for whom he/she wants to show map information and position information. When the captain performs this operation, the display control apparatus 100 performs control to make the mask 70 of the selected member display the map information and the position information.

Figure 10:
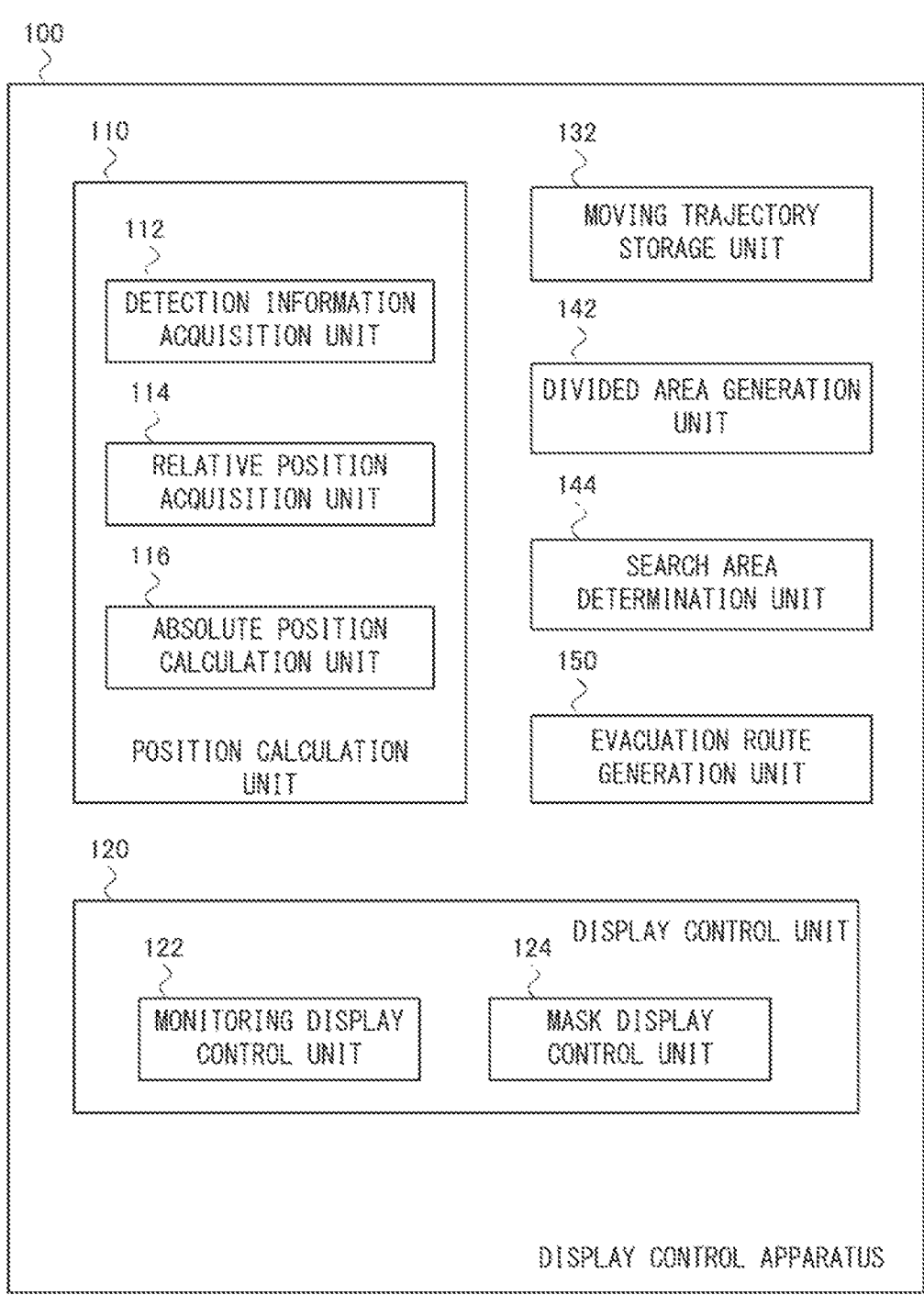
FIG. 10 shows a configuration of a display control apparatus according to the first example embodiment.

FIG. 10 shows a configuration of the display control apparatus 100 according to the first example embodiment. The display control apparatus 100 includes, as its components, a position calculation unit 110, a display control unit 120, a moving trajectory storage unit 132, a divided area generation unit 142, a search area determination unit 144, and an evacuation route generation unit 150. Further, the position calculation unit 110 includes a detection information acquisition unit 112, a relative position acquisition unit 114, and an absolute position calculation unit 116. Further, the display control unit 120 includes a monitoring display control unit 122 and a mask display control unit 124.

The position calculation unit 110 corresponds to the position calculation unit 12 shown in FIG. 1. The position calculation unit 110 functions as position calculation means. The display control unit 120 corresponds to the display control unit 14 shown in FIG. 1. The display control unit 120 functions as display control means. The moving trajectory storage unit 132 functions as moving trajectory storage means. The divided area generation unit 142 functions as divided area generation means. The search area determination unit 144 functions as search area determination means. The evacuation route generation unit 150 functions as evacuation route generation means.

Further, the detection information acquisition unit 112 functions as detection information acquisition means. The relative position acquisition unit 114 functions as relative position acquisition means. The absolute position calculation unit 116 functions as absolute position calculation means. Further, the monitoring display control unit 122 functions as monitoring display control means. The mask display control unit 124 functions as mask display control means.

Note that each of the above-described components can be implemented by, for example, executing a program under the control by the control unit 102. More specifically, each of the components can be implemented by having the control unit 102 execute a program stored in the storage unit 104. Further, each of the components may be implemented by recording a necessary program in an arbitrary non-volatile recording medium and installing it when required. Further, each of the components may be implemented by any combination of hardware, firmware, and software, as well as being implemented by software, e.g., by a program. Further, each of the components may be implemented by, for example, using a user-programmable integrated circuit such as an FPGA (field-programmable gate array) or a micro-computer. In this case, the program composed of each of the above-described components may be implemented (i.e., executed) by using the above-described integrated circuit.

Figure 11:
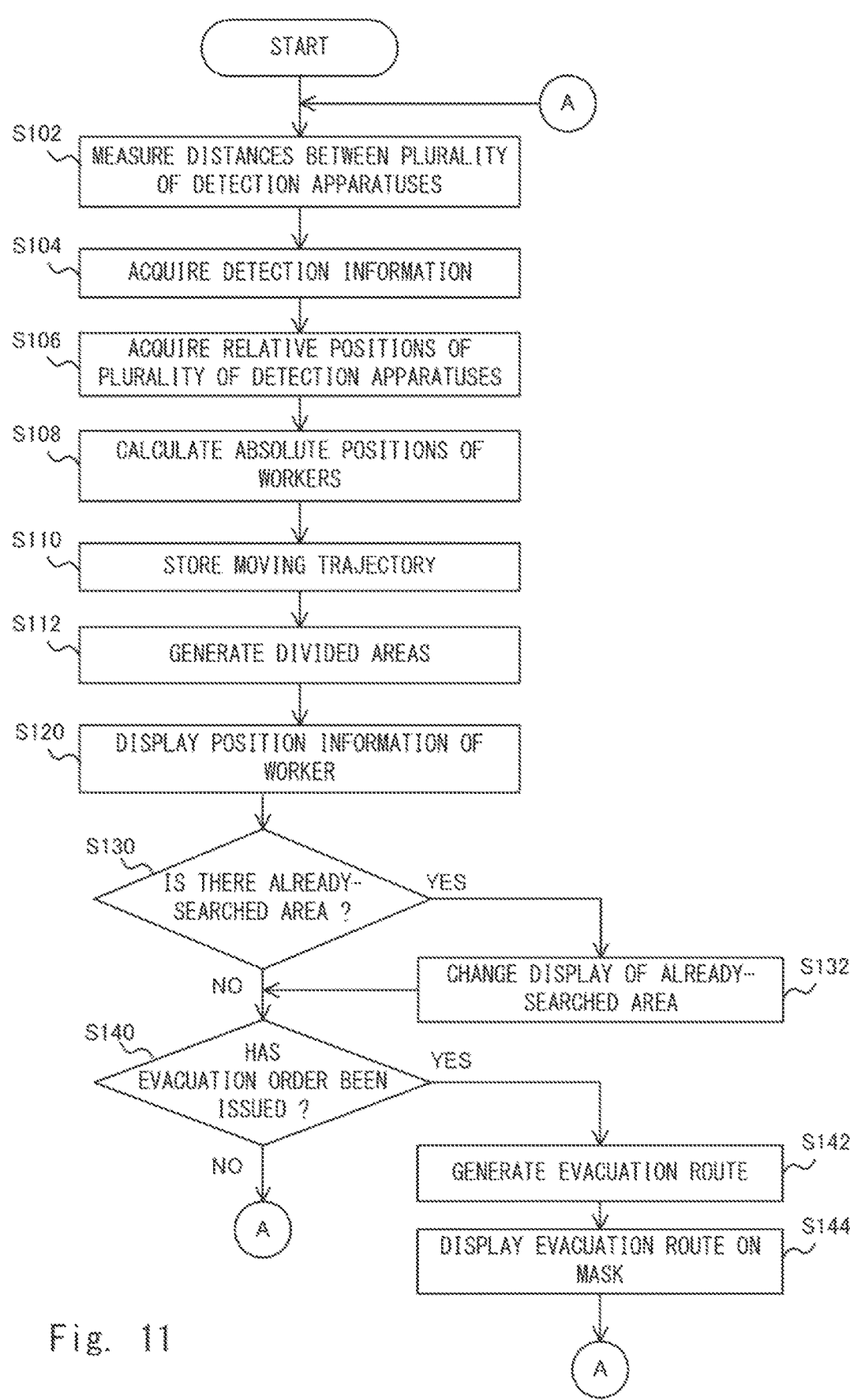
FIG. 11 is a flowchart for showing a display method performed by the display system according to the first example embodiment.

FIG. 11 is a flowchart showing a display method performed by the display system 20 according to the first example embodiment. The flowchart shown in FIG. 11 is mainly performed by the display control apparatus 100. As described above, distances between a plurality of detection apparatuses 60 are measured (Step S102). In this way, detection information including distance measurement result information is generated in each of worker apparatuses 50.

The position calculation unit 110 calculates the position of each member (worker) in the site (Steps S104 to S108). Specifically, the position calculation unit 110 calculates the position of each of a plurality of members (workers, i.e., working entities) relative to a reference point (anchor point 30) based on the relative positions of the plurality of detection apparatuses 60 relative to each other obtained by using the distance measurement result information. The aforementioned calculation and the like as well as each component of the position calculation unit 110 will be described hereinafter in detail.

The detection information acquisition unit 112 acquires detection information generated by the detection apparatus 60 attached to each member (worker) (Step S104). Specifically, the detection information acquisition unit 112 receives (acquires) detection information generated by the detection apparatus 60 from the worker apparatus 50 (the control apparatus 52 or the detection apparatus 60) worn by (or attached to) each member. In this way, detection information for the detection apparatus 60 attached to each member (hereinafter referred to simply as "detection information for each member") is acquired. Note that the detection information acquisition unit 112 acquires detection information by controlling the communication unit 106 of the information processing apparatus 101 (FIG. 4) installed in the display control apparatus 100. Note that as described above, detection information includes distance measurement result information, IMU information, and atmospheric pressure information.

The relative position acquisition unit 114 acquires relative positions of a plurality of detection apparatuses 60 (Step S106). Specifically, the relative position acquisition unit 114 acquires relative positions of the plurality of detection apparatuses 60 relative to each other by using distance measurement result information generated by each of the detection apparatuses 60 worn by (or attached to) the respective members. In other words, the relative position acquisition unit 114 acquires (calculates) relative positions of the plurality of detection apparatuses 60 relative to each other, i.e., relative positions of the plurality of members relative to each other, by using the distance measurement result information included in the detection information acquired by the detection information acquisition unit 112.

More specifically, the relative position acquisition unit 114 may detect the direction of a nearby member relative to the member of interest based on the direction of UWB radio waves transmitted from the UWB module 62 of the member of interest to the UWB module 62 of the nearby member and IMU information obtained by the inertia measurement device 64 of the member of interest. That is, the relative position acquisition unit 114 obtains the direction in which the member of interest is facing based on the IMU information. Then, the relative position acquisition unit 114 can detect, based on the direction that the member of interest is facing and the posture of the UWB module 62 relative to the member of interest, the direction of the UWB module 62 (detection apparatus 60) of the nearby member as observed from the UWB module 62 (detection apparatus 60) of the member of interest. Then, the relative position acquisition unit 114 can obtain (calculate) the relative position of the nearby member (detection apparatus 60) relative to the member of interest (detection apparatus 60) based on the detected direction and the distance from the detection apparatus 60 of the member of interest to the detection apparatus 60 of the nearby member. Note that the posture of the UWB module 62 relative to the member can be determined in advance based on the posture (e.g., the orientation and the like) in which the UWB module 62 (detection apparatus 60) is attached to the member.

Assume that, for example, the member B (detection apparatus 60B) is preset near the member A (detection apparatus 60A). In this case, the relative position acquisition unit 114 detects the direction of the member B (detection apparatus 60B) relative to the member A (detection apparatus 60A) based on the direction of UWB radio waves transmitted from the UWB module 62 of the member A to the UWB module 62 of the member B and the IMU information of the member A. In this way, the relative position acquisition unit 114 acquires the relative position of the member B (detection apparatus 60B) relative to the member A (detection apparatus 60A) based on the detected direction and the distance from the member A (detection apparatus 60A) to the member B (detection apparatus 60). Note that when there are three or more members near the member of interest, the relative position acquisition unit 114 may acquire the relative positions of the member of interest (detection apparatus 60) and the nearby members (detection apparatuses 60) relative to each other by a triangulation technique. That is, in this case, for the detection apparatus 60 of the member of interest, distances to the three or more detection apparatuses 60 have already been measured. Therefore, the relative position acquisition unit 114 can obtain (calculate) the relative positions of the member of interest (detection apparatus 60) and the nearby members (detection apparatuses 60) relative to each other by the principle of triangulation without detecting the directions of the nearby members relative to the member of interest. Assume that, for example, the member A (detection apparatus 60A), the member C (detection apparatus 60C), and the member D (detection apparatus 60D) are present near the member B (detection apparatus 60B). In this case, the relative position acquisition unit 114 may obtain the relative positions of the member B (detection apparatus 60B) and each of the member A (detection apparatus 60A), the member C (detection apparatus 60C), and member D (detection apparatus 60D) relative to each other by the principle of triangulation.

Further, assume that two members are present near the member of interest. In this case, the relative position acquisition unit 114 may acquire the relative positions of the member of interest (detection apparatus 60) and the nearby members (detection apparatus 60) relative to each other by combining the principle of triangulation with the direction of the nearby members relative to the member of interest. That is, in this case, for the detection apparatus 60 of the member of interest, only distances to the two detection apparatuses 60 are measured, so that the relative position of the member of interest relative to the two nearby members is not uniquely determined by the principle of triangulation alone. That is, it is not determined on which side of the straight line connecting the two nearby members the member of interest is located. In this case, the relative position acquisition unit 114 may acquire the relative position of the member of interest relative to the two nearby members by detecting the rough direction of each of the two nearby members relative to the member of interest by the above-described method and then using the principle of triangulation.

Assume that, for example, the member B (detection apparatus 60B) and the member D (detection apparatus 60D) are present near the member C (detection apparatus 60C). In this case, the relative position acquisition unit 114 detects the direction of each of the member B (detection apparatus 60B) and member D (detection apparatus 60D) relative to the member C (detection apparatus 60C). Then, the relative position acquisition unit 114 may acquire the relative positions of the member C (detection apparatus 60C) and each of the member B (detection apparatus 60B) and the member D (detection apparatus 60D) relative to each other by using these directions and the principle of triangulation.

The absolute position calculation unit 116 calculates an absolute position of each member (worker) (Step S108). Specifically, the absolute position calculation unit 116 calculates the position of each member (worker) relative to the reference point (anchor point 30) as an absolute position. More specifically, the absolute position calculation unit 116 calculates the absolute position of the member (detection apparatus 60) of which the relative position relative to the anchor point 30 has already been acquired. That is, the absolute position calculation unit 116 calculates the relative position of this member relative to the anchor point 30 as the absolute position of the member of interest. Assume that, for example, since the member A (detection apparatus 60A) is present near the anchor point 30, the relative position of the member A relative to the anchor point 30 has already been acquired. In this case, the absolute position calculation unit 116 calculates the relative position of the member A (detection apparatus 60A) relative to the anchor point 30 as the absolute position of the member A.

Then, the absolute position calculation unit 116 calculates, by a geometric method, the absolute position of the member (detection apparatus 60) of which the relative position relative to the member (detection apparatus 60) of which the absolute position has already been calculated has been calculated. For example, in the above-described example, the relative positions of the member A (detection apparatus 60A) and the member B relative to each other have already been acquired. In this case, the absolute position calculation unit 116 calculates, by a geometric method, the absolute position of the member B based on the absolute position of the member A and the relative position of the member B relative to the member A. For example, in a two-dimensional coordinate system, the absolute position of the member A is represented by $(Xa, Ya)$ and the relative position vector of the member B to the member A is represented by $(Xab, Yab)$. In this case, the absolute position calculation unit 116 may calculate the absolute position $(Xb, Yb)$ of the member B by using formulas $Xb=Xa+Xab$ and $Yb=Ya+Yab$. The absolute position calculation unit 116 calculates the absolute position of each of the other members in a similar manner. Note that when the number of members is large, the absolute position calculation unit 116 may calculate the absolute position of each member by using a multivariate analysis method such as MDS (Multi Dimensional Scaling).

Note that the position calculation unit 110 may specify the floor level on which the members are present by using atmospheric pressure information. That is, the position calculation unit 110 specifies (estimates) the floor level of the members (workers, i.e., working entities) in the site based on atmospheric pressure information detected in each of a plurality of detection apparatuses 60. The atmospheric pressure is the highest on the surface of the earth. Further, the more the altitude increases, i.e., the thinner the air becomes, the lower the atmospheric pressure becomes. The position calculation unit 110 measures an altitude by detecting changes in atmospheric pressure by using atmospheric pressure information. Specifically, the position calculation unit 110 determines an atmospheric pressure that is detected before the members enter the building, which is the site, as an atmospheric pressure on the first floor (ground level) which is used as a reference pressure (i.e., as a reference atmospheric pressure). Then, the position calculation unit 110 determines that the floor level of a member has increased (e.g., the member has risen to the second floor) when the atmospheric pressure indicated by the atmospheric pressure information related to that member has decreased from the reference pressure by a predetermined value or more.

The moving trajectory storage unit 132 stores a moving trajectory of each member (worker) (Step S110). Specifically, the moving trajectory storage unit 132 stores, for each member, moving trajectory data in which the absolute positions of that member are associated with times at which the absolute positions were obtained. Note that the moving trajectory is generated by plotting absolute positions of each member by using the moving trajectory data. The moving trajectory storage unit 132 can be implemented by the storage unit 104 of the information processing apparatus 101 installed in the display control apparatus 100.

The divided area generation unit 142 generates divided areas by dividing the work site of members into a plurality of areas (Step S112). Specifically, the divided area generation unit 142 generates a plurality of areas (divided areas) divided in a mesh pattern, which correspond to positions in the site. Each of the divided areas may be, for example, a rectangle each side of which is several meters. However, the shape of each divided area is not limited to the rectangle, but may be, for example, a hexagon. The divided areas will be described later.

The display control unit 120 performs control so that position information indicating the position of a member(s) (worker(s)) is displayed on the display device (Step S120). In this way, the position information of the member(s) (worker(s)) is displayed on the display device (the monitoring apparatus 40 and the mask 70). That is, a position information display screen image (or a position information display window) representing the position information of members is displayed on the display device under the control by the display control unit 120. In this process, the display control unit 120 performs control so that a plurality of divided areas are displayed and the positions of members (workers, i.e., working entities) are superimposed on the displayed divided areas.

The monitoring display control unit 122 performs control so that information about each member is displayed on the monitoring apparatus 40. In this way, the captain screen image 90 showing information about each member is displayed on the monitoring apparatus 40 as shown in FIG. 9.

Further, the monitoring display control unit 122 performs control so that position information of each member is displayed on the monitoring apparatus 40. Specifically, the monitoring display control unit 122 transmits, to the monitoring apparatus 40, an instruction for displaying position information of each member and divided areas on the monitoring apparatus 40. In this way, the interface unit 108 of the information processing apparatus 101 installed in the monitoring apparatus 40 displays the position information of members. In this way, the captain can easily find the position of each member. Further, in this process, the interface unit 108 of the monitoring apparatus 40 displays the position information of members so that the positions of the members are superimposed on the mesh-patterned divided areas. Further, in this process, the monitoring apparatus 40 performs control so that the position information is displayed in such a manner that the positions of members correspond to the positions of divided areas.

The mask display control unit 124 performs control so that information about each member is displayed on the mask 70 worn by (or attached to) the corresponding member. In this way, a member screen image 80 showing information about a corresponding member is displayed on the mask 70 worn by that member as shown in FIG. 8.

Further, the mask display control unit 124 performs control so that, for each member, the position information of members and a divided area are displayed on the mask 70 worn by that member. Specifically, the mask display control unit 124 transmits an instruction for displaying the position information of the members and the divided area on the mask 70 to the control apparatus 52 of the worker apparatus 50. As a result, the control apparatus 52 generates a screen image showing the position information of the members. Then, as the control apparatus 52 controls the head-up display 74, the head-up display 74 of the mask 70 worn by each member displays the position information of the members. In this way, the member can easily find the position of each member.

Further, the control apparatus 52 performs control so that the position information is displayed in such a manner that the position of each of the members corresponds to the position of the divided area. In this way, the control apparatus 52 generates a screen image in which the position of each of the members is superimposed on the mesh-patterned divided area. Then, the control apparatus 52 controls the head-up display 74, so that the head-up display 74 of the mask 70 worn by the member displays the position information of the members in such a manner that the position of each of the members is superimposed on the mesh-patterned divided area.

Further, the mask display control unit 124 may perform control so that when it displays, for each member, the position information of the members on the mask 70 worn by that member, it prominently displays the position of that member wearing this mask 70. That is, the mask display control unit 124 performs control so that the position of the member (worker) wearing the mask 70 of interest is displayed in such a manner that it is displayed more prominently than the positions of members (workers, i.e., working entities) other than this member are. For example, the mask display control unit 124 performs control so that the position of the member A is displayed on the mask 70 of the member A in a such a manner that it is displayed more prominently than the positions of the members B to D are.

For example, the mask display control unit 124 may perform control so that a specific marker is added only to the position information of the corresponding member. Alternatively, the mask display control unit 124 may perform control so that the position information of the corresponding member is displayed more clearly (more brightly) than those of other members are. Alternatively, the mask display control unit 124 may perform control so that an image (icon) indicating the position information of the corresponding member is displayed larger than those indicating the position information of other members are. Alternatively, the mask display control unit 124 may perform control so that the color of the image (icon) indicating the position information of the corresponding member is more prominent than that of the images (icons) indicating the position information of other members. For example, the image (icon) indicating the position information of the corresponding member may be displayed in red, and the images (icons) indicating the position information of other members may be displayed in black.

In this way, the member can easily find which of pieces of position information of a plurality of members displayed on the mask 70 is his/her piece of position information. Therefore, the member can find his/her position more easily.

Note that the captain (leader) may determine the member of which the position information is displayed on the mask 70 by operating the monitoring apparatus 40. Specifically, for example, when an operation for displaying position information on the mask 70 of the member A is performed on the monitoring apparatus 40, the monitoring apparatus 40 transmits an instruction to display the position information on the mask 70 of the member A to the display control apparatus 100. In this process, the mask display control unit 124 of the display control apparatus 100 transmits an instruction to display the position information of the members (and the divided area) on the mask 70A to the control apparatus 52A of the worker apparatuses 50A of the member A. As a result, the head-up display 74 of the mask 70A worn by the member A displays the position information of the members. Note that in this process, the position information of members may not be displayed on their masks 70 of the members other than the member A.

Note that the display control unit 120 may perform control so that contents different from those displayed on the mask 70 are displayed on the monitoring apparatus 40. Specifically, the monitoring display control unit 122 transmits, to the monitoring apparatus 40, an instruction to display a screen image different from that displayed on the mask 70 on the monitoring apparatus 40. In this way, as shown in FIGS. 8 and 9, a screen image different from that displayed on the mask 70 is displayed on the monitoring apparatus 40.

The search area determination unit 144 determines whether or not there is, among the plurality of divided area, one that has already been searched by a member (Step S130). When it is determined that there is a divided area that has already been searched by a member (Yes in S130), the display control unit 120 performs control so that the display of the divided area that has already been searched (hereinafter also referred to as an already-searched area) is changed (Step S132). That is, the display control unit 120 performs control so that a divided area determined to have already been searched by the member (worker, i.e., working entity) is displayed in a manner different from that for divided areas determined to have not yet been searched by the member (worker, i.e., working entity). On the other hand, when it is determined that there is no divided area that has already been searched by a member (No in S130), the process in the step S132 is not performed.

Specifically, for example, when at least one member reached a given divided area and then left that divided area, the search area determination unit 144 may determine this divided area as an already-searched area. Further, the search area determination unit 144 may determine an already-searched area by using the moving trajectory stored in the moving trajectory storage unit 132. Note that the method for determining whether or not a divided area has already been searched is not limited to the above-described example, and may be determined as appropriate according to the situation and the like of the site.

Further, the search area determination unit 144 may enable the captain to determine an already-searched area by operating the monitoring apparatus 40 (i.e., may determine an already-searched area by the captain operating the monitoring apparatus 40). That is, the captain may determine an already-searched area by visually checking the position information of members displayed on the monitoring apparatus 40. Then, the captain may specify an already-searched area by operating the monitoring apparatus 40 through the GUI. For example, the captain may designate an already-searched area by selecting the already-searched area through an operation such as tapping or clicking through the GUI in the interface unit 108 of the monitoring apparatus 40. Then, the monitoring apparatus 40 may transmit information indicating the already-searched area to the display control apparatus 100. The search area determination unit 144 may determine the already-searched area by using this information.

Further, for example, the display control unit 120 performs control so that the already-searched area is displayed darker than divided areas other than the already-searched area are. For example, the display control unit 120 may perform control so that the already-searched area is displayed as if it is filled with a certain color or the like.

Further, the monitoring display control unit 122 transmits, to the monitoring apparatus 40, an instruction to change how to display the already-searched area. In this way, the interface unit 108 of the information processing apparatus 101 installed in the monitoring apparatus 40 displays a screen image in which the way of displaying the already-searched area has been changed.

Similarly, the mask display control unit 124 transmits an instruction to change the way of displaying the already-searched area to the control apparatus 52 of the worker apparatuses 50. In this way, the control apparatus 52 generates a screen image in which the way of displaying the already-searched area has been changed. Then, the control apparatus 52 controls the head-up display 74, so that the head-up display 74 displays the screen image in which the way of displaying the already-searched area has been changed.

By changing the way of displaying the already-searched area as described above, the captain and members can easily recognize the already-searched area. As a result, the member can proceed with the searching activity mainly for divided areas other than the already-searched area. Further, the captain can instruct, while watching the screen of the monitoring apparatus 40, members as to which part in the site they should search.

The evacuation route generation unit 150 determines whether or not an evacuation order has been issued for the members (Step S140). Note that the evacuation order is an order for instructing the members to evacuate from the site. The evacuation order may be issued, for example, at the time of an emergency by the captain by operating the monitoring apparatus 40. In this case, the monitoring apparatus 40 may transmit information indicating that an evacuation order has been issued to the display control apparatus 100. The evacuation route generation unit 150 may determine that the evacuation order has been issued by using this information.

When an evacuation order is issued (Yes in S140), the evacuation route generation unit 150 generates an evacuation route for evacuating from the site for each member (Step S142). Further, the display control unit 120 (mask display control unit 124) performs control so that the evacuation route of each member is displayed on the mask 70 of that member (Step S144). Note that the display control unit 120 (mask display control unit 124) may perform control so that evacuation routes of other members are also displayed on the mask 70 of each member. That is, the display control unit 120 performs control to make a mask 70 display at least an evacuation route that is used when the member (worker) wearing this mask 70 evacuates from the site. On the other hand, when an evacuation order is not issued (No in S140), the processes in the steps S142 and S144 are not performed.

The evacuation route generation unit 150 may generate an evacuation route of a member (worker) based on the moving trajectory of that member (worker). Specifically, the evacuation route generation unit 150 may generate an evacuation route that extends along the moving trajectory of the member in a reversed manner. When doing so, if the member has not moved along the shortest route in the moving trajectory, the evacuation route generation unit 150 may generate an evacuation route that extends substantially along the moving trajectory but is the shortest route. In this way, an evacuation route is automatically generated, so that it becomes unnecessary to examine (e.g., create) an evacuation route at the time of an emergency. The mask display control unit 124 performs control so that the generated evacuation route is displayed on the mask 70.

Further, the evacuation route generation unit 150 may generate an evacuation route of a member (worker) according to an operation performed by the captain (leader). Specifically, the captain generates an evacuation route by operating the monitoring apparatus 40. For example, the captain hand-writes an evacuation route on the position information and the map information displayed on a touch panel of the monitoring apparatus 40, which is a tablet-type terminal, so that an evacuation route may be generated based on the hand-written evacuation route. The monitoring apparatus 40 transmits information representing this generated evacuation route to the display control apparatus 100. The evacuation route generation unit 150 may generates an evacuation route by using this information. In this way, for example, even when the evacuation route automatically generated as described above becomes unavailable due to the collapse of the building or the like, a new evacuation route can be manually generated. The mask display control unit 124 performs control so that the generated evacuation route is displayed on the mask 70.

Further, the evacuation route generation unit 150 may generate an indication of a direction in which the member should proceed. Then, the display control unit 120 (mask display control unit 124) performs control so that an evacuation route is displayed in such a manner that a direction in which the member (worker) wearing the mask 70 should proceed is displayed on this mask 70. Specifically, the evacuation route generation unit 150 generates an evacuation route automatically or by a manual method as described above. Then, the evacuation route generation unit 150 may generate a message indicating in which direction the member should proceed in the evacuation route. For example, the evacuation route generation unit 150 may generate a message such as "Proceed North", "Move Forward", or "Proceed Rightward". The mask display control unit 124 performs control so that the generated message indicating the evacuation route is displayed on the mask 70 (in the message display area 84 of the member screen image 80). The evacuation route generation unit 150 may generate an arrow(s) indicating in which direction the member should proceed in the evacuation route.

Specific Example

A specific example of the position information displayed on the mask 70 and the monitoring apparatus 40 will be described hereinafter.

Figure 12:
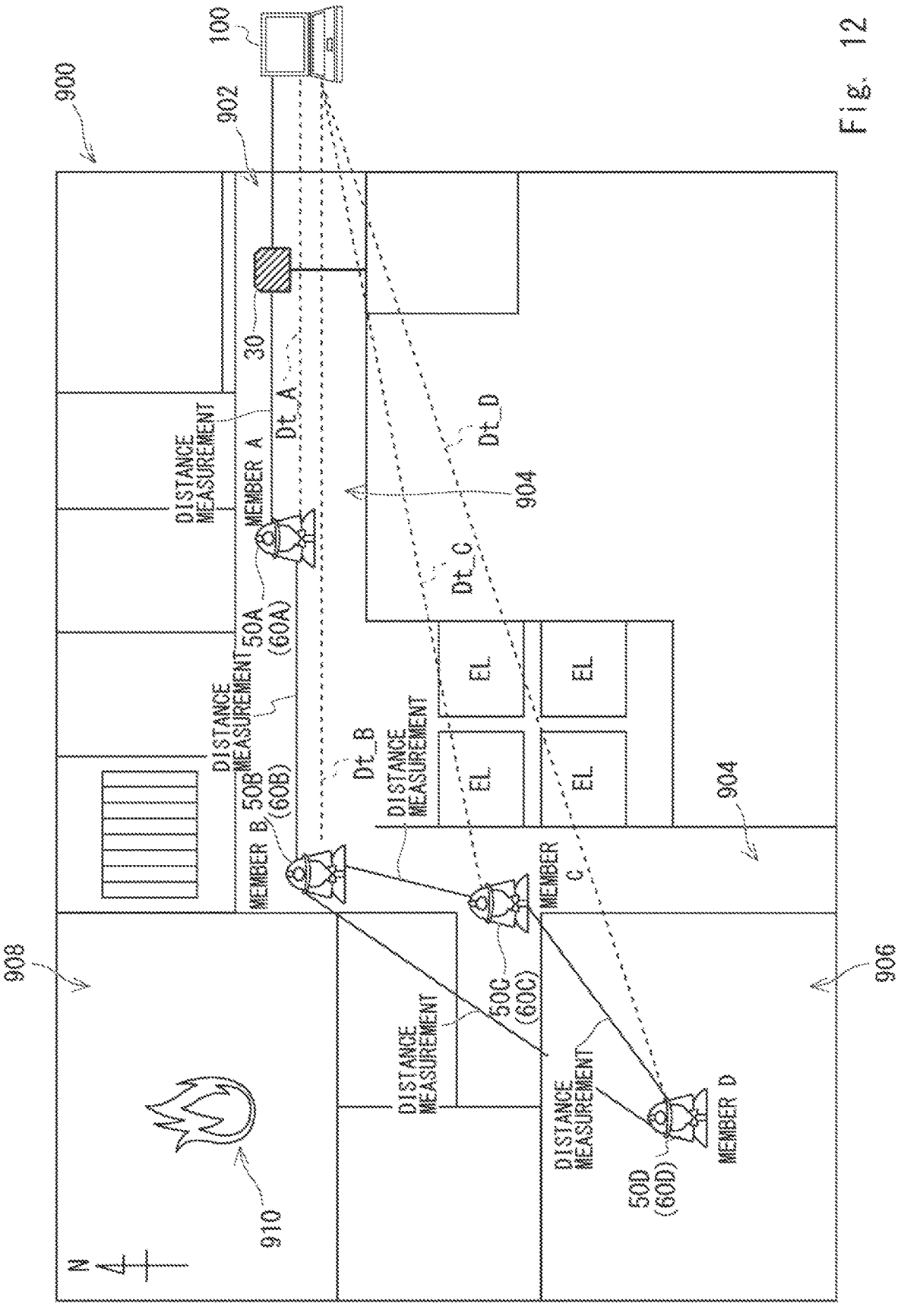
FIG. 12 shows an example of a site in which there is a member.

FIG. 12 shows an example of a site 900 in which members (e.g., of members of a fire brigade) are present. FIG. 12 shows an example in which members A to D are positioned in the site 900, which is a building. Further, the site 900 is a fire site. It is assumed that the upward in FIG. 12 is the north. The anchor point 30 is disposed near an entrance 902 of the site 900. Note that the anchor point 30 is not permanently installed in the site 900, but is installed by a member when he/she enters the site 900. As described above, the position of the anchor point 30 serves as a reference point for absolute positions of members (the origin in the coordinate system). The anchor point 30 is connected to the display control apparatus 100 so that they can communicate with each other.

The member A wearing the worker apparatus 50A (detection apparatus 60A) is present near and roughly west of the anchor point 30 on a passage 904. The member B wearing the worker apparatus 50B (detection apparatus 60B) is present near and roughly west of the member A on the passage 904. The member C wearing the worker apparatus 50C (detection apparatus 60C) is present near and roughly south of the member B on the passage 904. The member D wearing the worker apparatus 50D (detection apparatus 60D) is present inside a room 906. Further, the member D is present near the members B and C. Further, there is a fire origin 910 in a room 908 near the member B.

In this case, as described above with reference to FIG. 6, the distance between the anchor point 30 and the detection apparatus 60A is measured. Further, the distance between the detection apparatuses 60A and 60B is measured. Further, the distance between the detection apparatuses 60B and 60C is measured. Further, the distance between the detection apparatuses 60B and 60D is measured. Further, the distance between the detection apparatuses 60C and 60D is measured.

The detection apparatus 60A (control apparatus 52A) transmits detection information Dt_A to the display control apparatus 100. Further, the detection apparatus 60B (control apparatus 52B) transmits detection information Dt_B to the display control apparatus 100. Further, the detection apparatus 60C (control apparatus 52C) transmits detection information Dt_C to the display control apparatus 100. Further, the detection apparatus 60D (control apparatus 52D) transmits detection information Dt_D to the display control apparatus 100. Then, as described above, the position calculation unit 110 of the display control apparatus 100 calculates the absolute positions of the members A to D, i.e., the positions of the members A to D relative to the anchor point 30 (reference point) by using the detection information acquired from each of the detection apparatuses 60.

Figure 13:
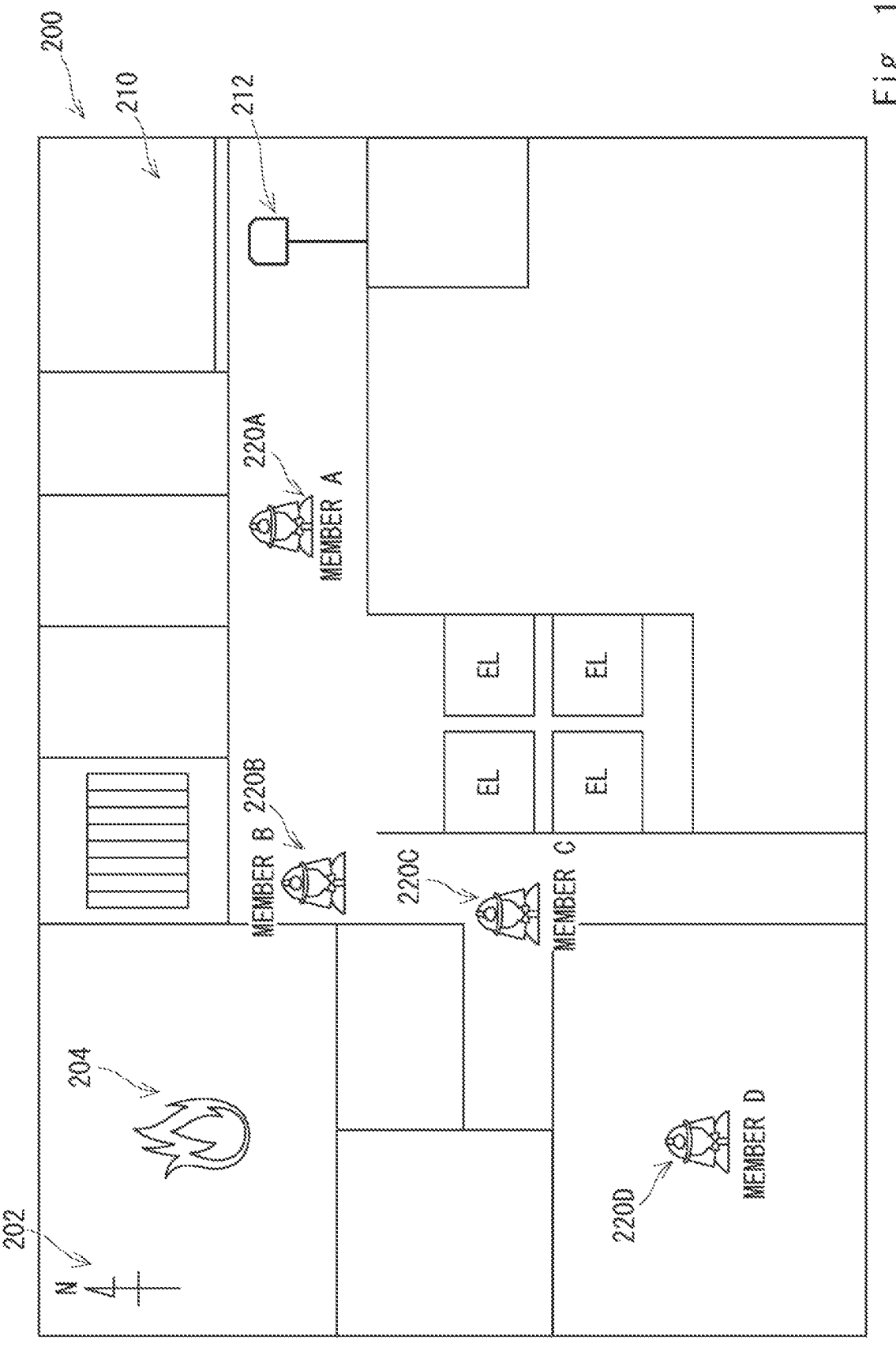
FIG. 13 shows an example of a position information display screen displayed by control by the display control apparatus according to the first example embodiment.

FIG. 13 shows an example of a position information display screen image (or a position information display window) 200 displayed under the control by the display control apparatus 100 according to the first example embodiment. As described above, the position information display screen image 200 is displayed on the mask 70 and the monitoring apparatus 40 under the control by the display control unit 120.

The position information display screen image 200 may be displayed in place of the photographed image in the photographed image display area 81 in the member screen image 80 (FIG. 8) displayed on the mask 70. Alternatively, the position information display screen image 200 may be displayed over the entire surface of the member screen image 80 displayed on the mask 70. The apparatus may be configured so that each member can switch how the position information display screen image 200 is displayed on the member screen image 80 by operating the operation switch 78 of the mask 70 worn by the member. Alternatively, the apparatus may be configured so that the captain can switch how the position information display screen image 200 is displayed on the member screen image 80 displayed on the mask 70 of each member by operating the monitoring apparatus 40.

The position information display screen image 200 may be displayed in the map display area 91 in the captain screen image 90 displayed on the monitoring apparatus 40 (FIG. 9). Alternatively, the position information display screen image 200 may be displayed in place of the activity status image(s) 94 for each member in the activity status display area 93 in the captain screen image 90. Alternatively, the position information display screen image 200 may be displayed over the entire surface of the captain screen image 90 displayed on the monitoring apparatus 40. The apparatus may be configured so that the captain can switch how the position information display screen image 200 is displayed on the captain screen image 90 by operating the monitoring apparatus 40.

The position information display screen image 200 displays map information 210 corresponding to the floor map of the site 900. Further, the position information display screen image 200 may display a direction mark 202 indicating a northward direction in the map information 210. Further, when the position of the fire origin 910 in the site 900 is known, in the position information display screen image 200, a fire origin mark 204 may be display at a corresponding place in the map information 210. The direction mark 202 and the fire origin mark 204 may be displayed under the control by the display control unit 120. The fire origin mark 204 may be displayed by the captain as he/she designates the position of the fire origin 910 by operating the monitoring apparatus 40. Specifically, the monitoring apparatus 40 transmits the position information of the designated fire origin 910 to the display control apparatus 100. Then, the display control unit 120 performs control so that the fire origin mark 204 is displayed at a position corresponding to the position of the fire origin 910 in the map information 210.

Then, the position information display screen image 200 displays the image of the anchor point 30 and the images (icons) of the members A to D so that they are superimposed on the map information 210. Specifically, the position information display screen image 200 displays an anchor point image 212 at a place corresponding to the position of the anchor point 30 on the map information 210. Further, the position information display screen image 200 displays a member image 220A of the member A at a place corresponding to the position of the member A on the map information 210. Further, the position information display screen image 200 displays a member image 220B of the member B at a place corresponding to the position of the member B on the map information 210. Further, the position information display screen image 200 displays a member image 220C of the member C at a place corresponding to the position of the member C on the map information 210. Further, the position information display screen image 200 displays a member image 220D of the member D at a place corresponding to the position of the member D on the map information 210. Note that the member image 220 of each member shows the position information of that member. Further, for each member image 220, identification information (such as a name) of the corresponding member may be displayed near the member image 220. Note that when the captain selects a member image 220 in the position information display screen image 200 by, for example, a tapping operation or a clicking operation, an image taken by the photographing device 72 provided in the mask 70 of the member corresponding to the selected member image 220 may be displayed. Alternatively, for each member image 220, an image taken by the photographing device 72 provided in the mask 70 of the member corresponding to that member image 220 may be displayed near that member image 220 or superimposed on that member image 220.

Since the position information display screen image 200 as shown in FIG. 13 is displayed on the mask 70 under the control by the display control apparatus 100 (display control unit 120), each member (worker) can easily find the position of each of members (workers, i.e., working entities). Further, since the position information display screen image 200 as shown in FIG. 13 is displayed on the monitoring apparatus 40 under the control by the display control apparatus 100 (display control unit 120), the captain (leader) can easily find the position of each of members (workers, i.e., working entity).

Figure 14:
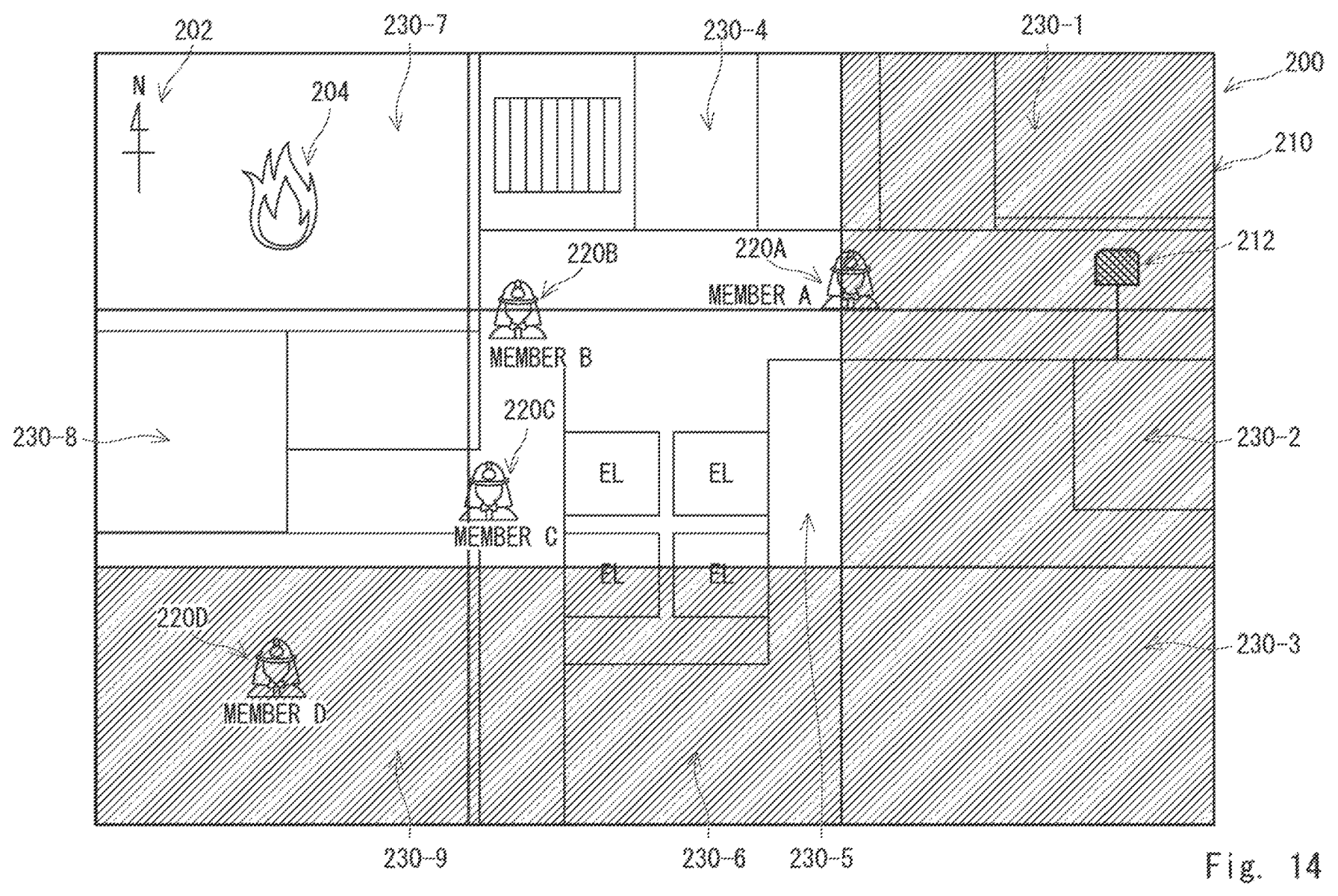

FIG. 14 shows an example of a state in which divided areas 230 are displayed on the position information display screen image 200 shown in FIG. 13. In the example shown in FIG. 14, nine divided areas 230-1 to 230-9 are displayed on the position information display screen image 200. Further, in the position information display screen image 200, member images 220 representing position information of respective members are displayed in the divided areas 230 in a superimposed manner.

Further, in the example shown in FIG. 14, the divided areas 230-1, 230-2, 230-3, 230-6 and 230-9 are already-searched areas. Therefore, the way of displaying the divided areas 230-1, 230-2, 230-3, 230-6 and 230-9, which are the already-searched areas, is different from that for displaying the divided areas 230-4, 230-5, 230-7 and 230-8, which are not already-searched areas. In the example shown in FIG. 14, the divided area 230-1, 230-2, 230-3, 230-6 and 230-9, which are the already-searched areas, are displayed in a shaded manner as if they are filled with a dark color or the like.

Since the position information display screen image 200 as shown in FIG. 14 is displayed on the mask 70 under the control by the display control apparatus 100 (display control unit 120), each member (worker) can easily recognize the already-searched areas. Further, since the position information display screen image 200 as shown in FIG. 14 is displayed on the monitoring apparatus 40 under the control by the display control apparatus 100 (display control unit 120), the captain (leader) can easily recognize the already-searched areas. Further, as a result, the captain can instruct, while watching the position information of each member, each member about a place that he/she should search by wirelessly-transmitted voices or the like.

Figure 15:
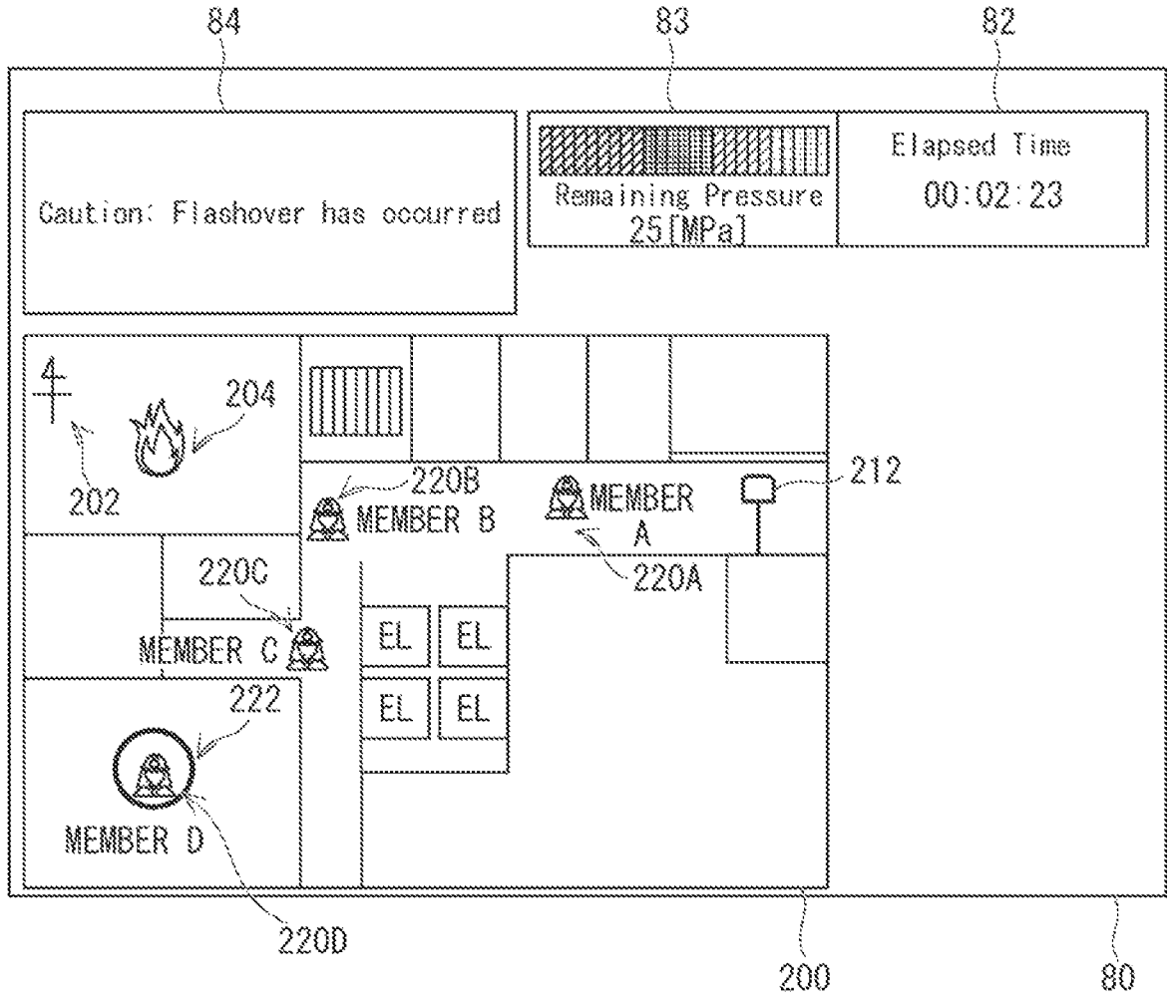
FIG. 15 shows an example of a state in which the position information display screen shown in FIG. 13 is displayed on a member screen.

FIG. 15 shows an example of a state in which the position information display screen image 200 shown in FIG. 13 is displayed on the member screen image 80. FIG. 15 shows an example of the member screen image 80 displayed on the mask 70D of the member D. In the example shown in FIG. 15, the position information display screen image 200 is displayed in the position of the photographed image display area 81 of the member screen image 80 shown in FIG. 8. In this way, the member D can easily find his own position and the positions of other members. Further, since a similar position information display screen image 200 is displayed on the mask 70 of each of other members, each of the other members can also easily find his/her own position and the positions of other members in a similar manner. Note that the worker apparatus 50 (the control apparatus 52 or the mask 70) may acquire, from the display control apparatus 100, an image taken by the photographing device 72 provided in the mask 70 of any of the other members. In this case, when a member selects the member image 220 in the position information display screen image 200 by voices or the like, an image taken by the photographing device 72 provided in the mask 70 of the member corresponding to the selected member image 220 may be displayed. In this case, the control apparatus 52 may perform voice recognition processing on voices of the member voice and select the member image 220. For example, when the member D utters "member A", the control apparatus 52 performs voice recognition on a voice signal input by the microphone 76a, selects the member image 220A, and displays an image taken by the photographing device 72 of the member A near the member image 220A or the like. Alternatively, for each member image 220, an image taken by the photographing device 72 provided in the mask 70 of a member corresponding to that member image 220 may be displayed near that member image 220 or superimposed on that member image 220.

Further, in the position information display screen image 200 shown in FIG. 15, a marker 222 indicating the position of the member himself/herself is added to the member image 220D of the member D. In this way, the member D can easily find which of a plurality of member images 220 corresponds to himself/herself. Therefore, the member D can easily find his/her position. Further, since a similar position information display screen image 200 is displayed on the mask 70 of each of other members, each of the other members can also easily find his/her own position in a similar manner.

Note that when the display control unit 120 (mask display control unit 124) displays the position information display screen image 200 on the mask 70D worn by the member D, it performs control so as to add the marker 222 to the member image 220D of the member D. Then, the mask display control unit 124 transmits an instruction for adding the marker 222 to the member image 220 of the member D to the control apparatus 52D of the worker apparatuses 50D. In this way, the control apparatus 52D generates the position information display screen image 200 in which the marker 222 is added to the position information (member image 220D) of the member D.

Note that although the marker 222 is circular in the example shown in FIG. 15, the shape of the marker 222 may be any shape. Further, the configuration according to this example embodiment is not limited to adding a marker to the image 220D of the member D. As described above, various ways of displaying the image 220D of the member D more conspicuously than the images 220 of the other members are conceivable.

Figure 16:
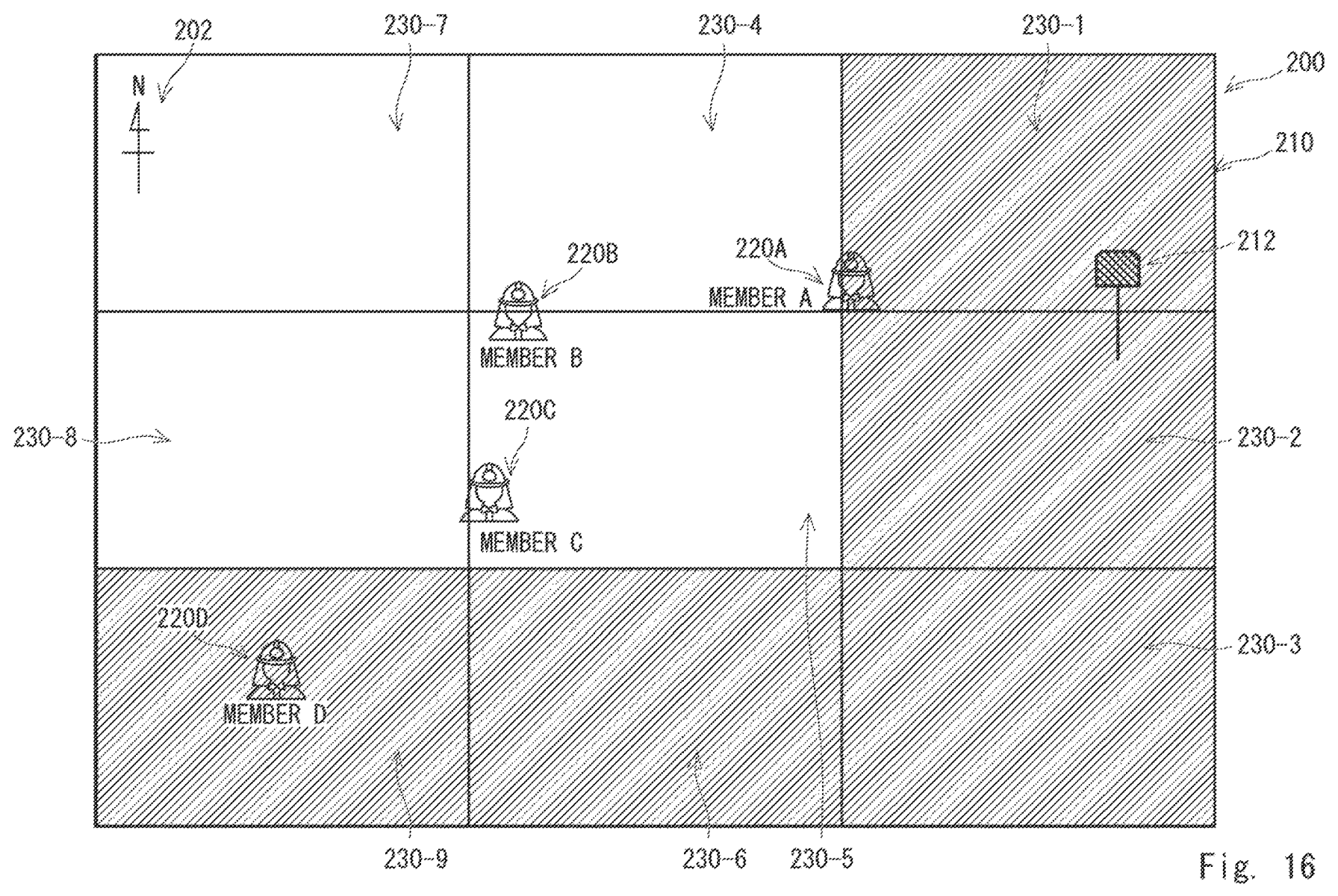

FIG. 16 shows an example of a state in which no map information 210 is displayed in the position information display screen image 200 shown in FIG. 14. In the example shown in FIG. 16, an anchor point image 212, images 220A to 220D of respective members, a direction mark 202, and divided areas 230-1 to 230-9 are displayed in the position information display screen image 200. Note that the anchor point image 212 and a plurality of member images 220 are arranged over the divided areas 230 separated in a mesh pattern. Further, as described above, the anchor point 30 is installed near the entrance 902 of the site 900. Therefore, each of members and the captain can find where each member is positioned relative to the entrance 902 in the site 900 without requiring map information.

Figure 17:
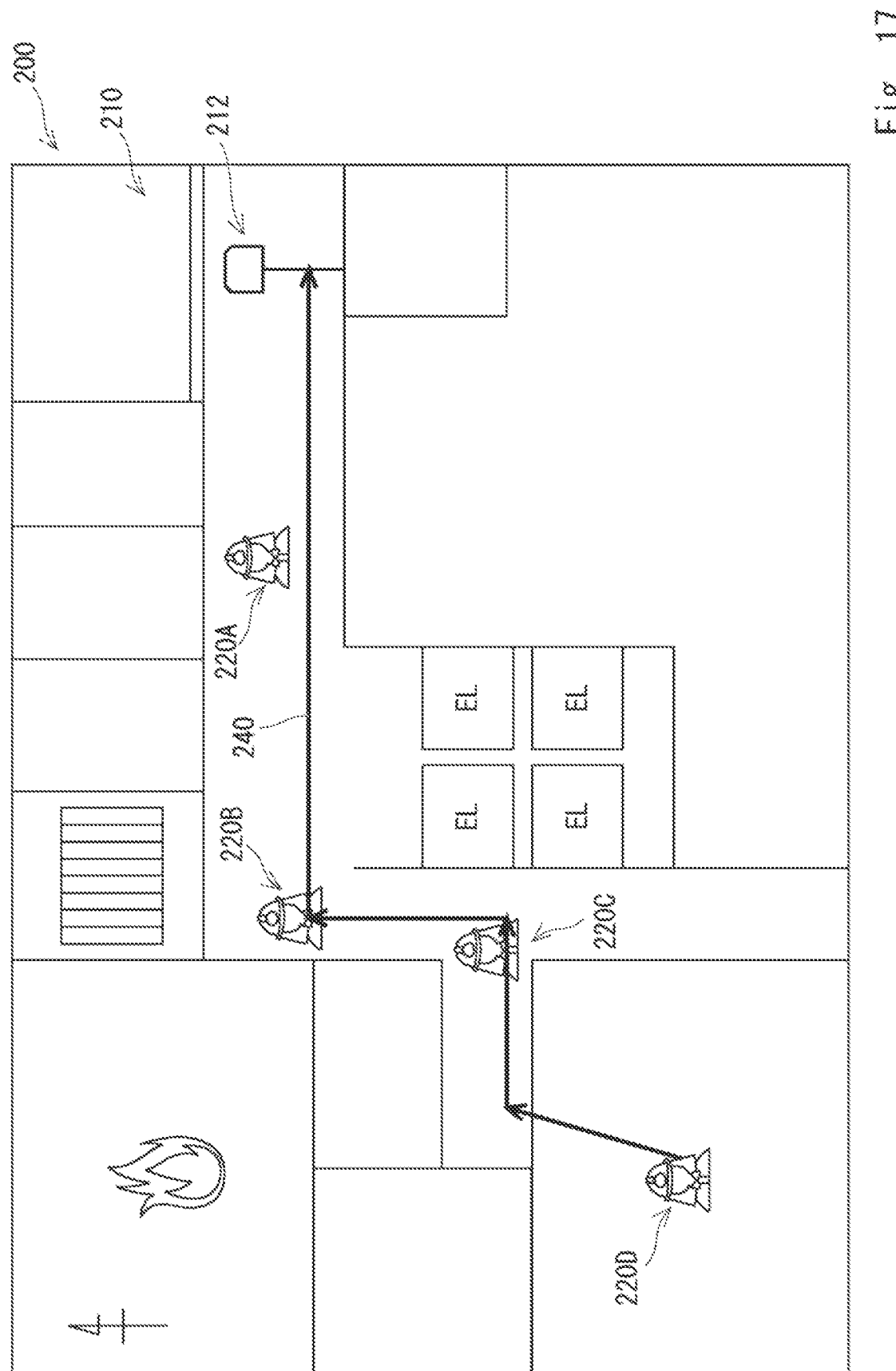
FIG. 17 shows an example of a state in which an evacuation route is displayed on the position information display screen shown in FIG. 13.

FIG. 17 shows an example of a state in which an evacuation route is displayed in the position information display screen image 200 shown in FIG. 13. As shown in FIG. 17, an evacuation route 240 generated by the evacuation route generation unit 150 is displayed in the position information display screen image 200 under the control by the display control unit 120. In the example shown in FIG. 17, an evacuation route 240 for the member D is displayed. The display control unit 120 may perform control so that the position information display screen image 200 shown in FIG. 17 is displayed at least on the mask 70 of the member D. Further, the display control unit 120 may also perform control so that the position information display screen image 200 shown in FIG. 17 is displayed on the monitoring apparatus 40.

In this way, each member can easily find an evacuation route at the time of emergency evacuation. Further, at the time of emergency evacuation, each member can and should move along the evacuation route. In particular, at the time of emergency evacuation, some members may become panicked and may not find their current positions nor the direction in which they should proceed. In this example embodiment, such members can be assisted. Note that as described above, an evacuation route may be displayed in the form of a message indicating the direction in which the member should proceed. For example, the display control unit 120 (mask display control unit 124) may perform control so that a message such as "Proceed North", "Move Forward", "Proceed Rightward", or "Move Straight about 10 m and then Turn Right" is displayed in the message display area 84 of the member screen image 80. Alternatively, the display control unit 120 (mask display control unit 124) may perform control so that a figure (e.g., an arrow or the like) indicating the direction in which the member should proceed is displayed on the member screen image 80. The figure indicating the direction in which the member should proceed may be displayed, for example, on the position information display screen image 200 in a superimposed manner.

Note that even if the member screen image 80 suddenly disappears on the mask 70 due to some trouble or the like, the captain may instruct the member by wirelessly-transmitted voices or the like while watching the position information display screen image 200 displayed in the monitoring apparatus 40 as shown in FIG. 17. Alternatively, in such a case, the control apparatus 52 may automatically generate voice information corresponding to an evacuation route. Then, the speaker 76b of the mask 70 may output the generated voice information.

Modified Example

Note that the present invention is not limited to the above-described example embodiments, and they may be modified as appropriate without departing from the scope and spirit of the invention. For example, the order of processes in the flowchart shown in FIG. 11 may be changed as appropriate. Further, at least one of the processes in the flowchart shown in FIG. 11 may be omitted. For example, in the flowchart shown in FIG. 11, the processes in the steps S112 and S130-S144 may be omitted. Further, in the flowchart shown in FIG. 11, the order of the processes in the steps S130 to S132 and the processes in the steps S140 to S144 may be reversed.

Further, although a member (worker) performs work in a site in the first example embodiment, mobile objects other than human workers may perform work. For example, mobile objects such as robots, unmanned work vehicles, or drones may perform work in a site. In this case, the mobile objects are working entities. Note that the detection apparatus 60 may be attached to (installed in) the mobile object, but the mask 70 may not be attached thereto.

Further, although the mask 70 displays the member screen image 80 (position information or the like) by using the head-up display 74 in the above-described example embodiment, the present invention is not limited to this configuration. The mask 70 may not display information by using the head-up display 74. For example, information may be displayed on a screen such as a liquid crystal screen provided in the mask 70. However, by displaying the member screen image 80 as an imaginary image (i.e., virtual image) by using the head-up display 74, the member needs to move his/her line of sight only by a minimum amount when he/she views the member screen image 80.

Further, although the display control apparatus 100 (position calculation unit 110) calculates the relative position of each member, the present invention is not limited to this configuration. The worker apparatus 50 (e.g., the control apparatus 52) may instead calculate the relative position. In this case, the relative position acquisition unit acquires (receives) the relative position information from the worker apparatus 50 (control apparatus 52).

Further, although radio waves are directly transmitted and received between a plurality of detection apparatus (UWB modules) in the above-described example embodiment, the present invention is not limited to this configuration. In the case where the distance between members could increase so much that UWB radio waves cannot be received, the members may install a relay apparatus(es) in the site. Note that the relay apparatus includes a UWB module. In this way, each detection apparatus can transmit and receive radio waves to and from other detection apparatuses through the relay apparatus(es).

In the above-described examples, the program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disk (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Although the present invention is described above with reference to example embodiments, the present invention is not limited to the above-described example embodiments. Various modifications that can be understood by those skilled in the art can be made to the configuration and details of the present invention within the scope of the invention.

The whole or part of the example embodiments disclosed above can be described as, but not limited to, the following supplementary notes.

Supplementary Note 1

A display control apparatus comprising:
position calculation means for calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and
display control means for performing control so that position information indicating the position of at least one working entity is displayed on a mask attached to a worker who is the working entity.

Supplementary Note 2

The display control apparatus described in Supplementary note 1, wherein the display control means performs control so that a position of the worker wearing the mask is displayed more conspicuously than a position of a working entity different from the worker is.

Supplementary Note 3

The display control apparatus described in Supplementary note 1 or 2, wherein the display control means performs control so that an evacuation route is displayed on the mask, the evacuation route being one that is used by at least the worker wearing the mask when he/she evacuates from the site.

Supplementary Note 4

The display control apparatus described in Supplementary note 3, wherein the display control means performs control so that the evacuation route generated based on a moving trajectory of the worker is displayed on the mask.

Supplementary Note 5

The display control apparatus described in Supplementary note 3, wherein the display control means performs control so that the evacuation route generated according to an operation performed by a leader who leads in the site is displayed on the mask.

Supplementary Note 6

The display control apparatus described in Supplementary note 3, wherein the display control means performs control so that the evacuation route is displayed on the mask by displaying a direction in which the worker wearing this mask should proceed.

Supplementary Note 7

The display control apparatus described in any one of Supplementary notes 1 to 6, wherein the display control means performs control so that a plurality of areas, divided in a mesh pattern, corresponding to positions in the site are displayed on the mask and a position of the working entity is superimposed on the displayed areas.

Supplementary Note 8

The display control apparatus described in Supplementary note 7, wherein the display control means performs control so that a way of displaying an area determined to have already been searched by the working entity is different from that for displaying an area determined to have not yet been searched by the working entity.

Supplementary Note 9

The display control apparatus described in any one of Supplementary notes 1 to 8, wherein the display control means performs control to make a monitoring apparatus of a leader who leads in the site display a position of the working entity, and the display control means performs control to make the monitoring apparatus display a content different from that displayed on the mask.

Supplementary Note 10

The display control apparatus described in any one of Supplementary notes 1 to 9, wherein the position calculation means specifies a floor level on which the working entity is present in the site based on atmospheric pressure information indicating atmospheric pressures detected in the plurality of detection apparatus, respectively.

Supplementary Note 11

A display system comprising:

a plurality of detection apparatuses each of which is attached to a respective one of a plurality of working entities working in a site;

a mask attached to a worker who is the working entity; and a display control apparatus, wherein each of the plurality of detection apparatuses transmits and receives a radio wave to and from another detection apparatus, and thereby measures a distance to the other detection apparatus, the display control apparatus includes:

position calculation means for calculating a position of each of the plurality of working entities relative to a reference point by using distance measurement result information indicating results of the measurements of the distances; and display control means for performing control so that position information indicating the position of at least one working entity is displayed on a mask attached to a worker who is the working entity, and the mask displays position information of the working entity according to control by the display control apparatus.

Supplementary Note 12

The display system described in Supplementary note 11, wherein the display control means performs control so that a position of the worker wearing the mask is displayed more conspicuously than a position of a working entity different from the worker is.

Supplementary Note 13

The display system described in Supplementary note 11 or 12, wherein the display control means performs control so that an evacuation route is displayed on the mask, the evacuation route being one that is used by at least the worker wearing the mask when he/she evacuates from the site.

Supplementary Note 14

The display system described in Supplementary note 13, wherein the display control means performs control so that the evacuation route generated based on a moving trajectory of the worker is displayed on the mask.

Supplementary Note 15

The display system described in Supplementary note 13, wherein the display control means performs control so that the evacuation route generated according to an operation performed by a leader who leads in the site is displayed on the mask.

Supplementary Note 16

The display system described in Supplementary note 13, wherein the display control means performs control so that the evacuation route is displayed on the mask by displaying a direction in which the worker wearing this mask should proceed.

Supplementary Note 17

The display system described in any one of Supplementary notes 11 to 16, wherein the display control means performs control so that a plurality of areas, divided in a mesh pattern, corresponding to positions in the site are displayed on the mask and a position of the working entity is superimposed on the displayed areas.

Supplementary Note 18

The display system described in Supplementary note 17, wherein the display control means performs control so that a way of displaying an area determined to have already been searched by the working entity is different from that for displaying an area determined to have not yet been searched by the working entity.

Supplementary Note 19

The display system described in any one of Supplementary notes 11 to 18, wherein the display control means performs control to make a monitoring apparatus of a leader who leads in the site display a position of the working entity, and the display control means performs control to make the monitoring apparatus display a content different from that displayed on the mask.

Supplementary Note 20

The display system described in any one of Supplementary notes 11 to 19, wherein the position calculation means specifies a floor level on which the working entity is present in the site based on atmospheric pressure information indicating atmospheric pressures detected in the plurality of detection apparatus, respectively.

Supplementary Note 21

The display system described in any one of Supplementary notes 11 to 20, wherein the mask is provided with a voice input/output device configured to input and output a voice through bone conduction.

Supplementary Note 22

The display system described in any one of Supplementary notes 11 to 21, wherein the mask displays an imaginary image in front of the worker wearing the mask.

Supplementary Note 23

A display method comprising:

calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and performing control so that position information indicating the position of at least one working entity is displayed on a mask attached to a worker who is the working entity.

Supplementary Note 24

The display method described in Supplementary note 23, wherein control is performed so that a position of the worker wearing the mask is displayed more conspicuously than a position of a working entity different from the worker is.

Supplementary Note 25

The display method described in Supplementary note 23 or 24, wherein control is performed so that an evacuation route is displayed on the mask, the evacuation route being one that is used by at least the worker wearing the mask when he/she evacuates from the site.

Supplementary Note 26

The display method described in Supplementary note 25, wherein control is performed so that the evacuation route generated based on a moving trajectory of the worker is displayed on the mask.

Supplementary Note 27

The display method described in Supplementary note 25, wherein control is performed so that the evacuation route generated according to an operation performed by a leader who leads in the site is displayed on the mask.

Supplementary Note 28

The display method described in Supplementary note 25, wherein control is performed so that the evacuation route is displayed on the mask by displaying a direction in which the worker wearing this mask should proceed.

Supplementary Note 29

The display method described in any one of Supplementary notes 23 to 28, wherein control is performed so that a plurality of areas, divided in a mesh pattern, corresponding to positions in the site are displayed on the mask and a position of the working entity is superimposed on the displayed areas.

Supplementary Note 30

The display method described in Supplementary note 29, wherein control is performed so that a way of displaying an area determined to have already been searched by the working entity is different from that for displaying an area determined to have not yet been searched by the working entity.

Supplementary Note 31

The display system described in any one of Supplementary notes 23 to 30, wherein
control is performed to make a monitoring apparatus of a leader who leads in the site display a position of the working entity, and
control is performed to make the monitoring apparatus display a content different from that displayed on the mask.

Supplementary Note 32

The display method described in any one of Supplementary notes 23 to 31, wherein a floor level on which the working entity is present in the site is specified based on atmospheric pressure information indicating atmospheric pressures detected in the plurality of detection apparatus, respectively.

Supplementary Note 33

A non-transitory computer readable medium storing a program for causing a computer to perform:
a step of calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and
a step of performing control so that position information indicating the position of at least one working entity is displayed on a mask attached to a worker who is the working entity.

REFERENCE SIGNS LIST

1 DISPLAY SYSTEM
2 DETECTION APPARATUS
4 MASK
6 WORKING SUBJECT
10 DISPLAY CONTROL APPARATUS
12 POSITION CALCULATION UNIT
14 DISPLAY CONTROL UNIT
20 DISPLAY SYSTEM
22 NETWORK
30 ANCHOR POINT
40 MONITORING APPARATUS
50 WORKER APPARATUS
52 CONTROL APPARATUS
60 DETECTION APPARATUS
62 UWB MODULE
64 INERTIA MEASUREMENT APPARATUS
66 ATMOSPHERIC PRESSURE SENSOR
70 MASK
72 PHOTOGRAPHING DEVICE
74 HEAD-UP DISPLAY
76 VOICE INPUT/OUTPUT DEVICE
76a MICROPHONE
76b SPEAKER
78 OPERATION SWITCH
80 MEMBER SCREEN IMAGE
81 PHOTOGRAPHED IMAGE DISPLAY AREA
82 ENTRY ELAPSED TIME DISPLAY AREA
83 AIR CYLINDER REMAINING PRESSURE DISPLAY AREA
84 MESSAGE DISPLAY AREA
90 CAPTAIN SCREEN IMAGE
91 MAP DISPLAY AREA
92 MESSAGE TRANSMISSION AREA
93 ACTIVITY STATUS DISPLAY AREA
94 ACTIVITY STATUS IMAGE
100 DISPLAY CONTROL APPARATUS
101 INFORMATION PROCESSING APPARATUS
110 POSITION CALCULATION UNIT
112 DETECTION INFORMATION ACQUISITION UNIT
114 RELATIVE POSITION ACQUISITION UNIT
116 ABSOLUTE POSITION CALCULATION UNIT
120 DISPLAY CONTROL UNIT
122 MONITORING DISPLAY CONTROL UNIT

124 MASK DISPLAY CONTROL UNIT
132 MOVING TRAJECTORY STORAGE UNIT
142 DIVIDED AREA GENERATION UNIT
144 SEARCH AREA DETERMINATION UNIT
150 EVACUATION ROUTE GENERATION UNIT
200 POSITION INFORMATION DISPLAY SCREEN
    IMAGE
210 MAP INFORMATION
212 ANCHOR POINT IMAGE
220 MEMBER IMAGE
222 MARKER
230 DIVIDED AREA
240 EVACUATION ROUTE

What is claimed is:

1. A display control apparatus comprising:
hardware, including a processor and memory;
position calculation unit implemented at least by the hardware and configured to calculate a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities; and
display control unit implemented at least by the hardware and configured to perform control so that position information indicating the position of at least one working entity is displayed on a mask attached to a worker who is the working entity,
wherein the display control unit performs control so that an evacuation route generated based on a moving trajectory of the worker is displayed on the mask, the evacuation route being one that is used by at least the worker wearing the mask when he/she evacuates from the site.

2. The display control apparatus according to claim 1, wherein the display control unit performs control so that a position of the worker wearing the mask is displayed more conspicuously than a position of a working entity different from the worker is.

3. The display control apparatus according to claim 1, wherein the display control unit performs control so that the evacuation route generated according to an operation performed by a leader who leads in the site is displayed on the mask.

4. The display control apparatus according to claim 3, wherein the display control unit performs control so that the evacuation route is displayed on the mask by displaying a direction in which the worker wearing this mask should proceed.

5. The display control apparatus according to claim 1, wherein the display control unit performs control so that a plurality of areas, divided in a mesh pattern, corresponding to positions in the site are displayed on the mask and a position of the working entity is superimposed on the displayed areas.

6. The display control apparatus according to claim 5, wherein the display control unit performs control so that a way of displaying an area determined to have already been searched by the working entity is different from that for displaying an area determined to have not yet been searched by the working entity.

7. The display control apparatus according to claim 1, wherein the display control unit performs control to make a monitoring apparatus of a leader who leads in the site display a position of the working entity, and
the display control unit performs control to make the monitoring apparatus display a content different from that displayed on the mask.

8. The display control apparatus according to claim 1, wherein the position calculation unit specifies a floor level on which the working entity is present in the site based on atmospheric pressure information indicating atmospheric pressures detected in the plurality of detection apparatus, respectively.

9. A display method comprising:
calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities;
performing control so that position information indicating the position of at least one working entity is displayed on a mask attached to a worker who is the working entity; and
performing control so that an evacuation route generated based on a moving trajectory of the worker is displayed on the mask, the evacuation route being one that is used by at least the worker wearing the mask when he/she evacuates from the site.

10. The display method according to claim 9, wherein control is performed so that a position of the worker wearing the mask is displayed more conspicuously than a position of a working entity different from the worker is.

11. The display method according to claim 9, wherein control is performed so that an evacuation route is displayed on the mask, the evacuation route being one that is used by at least the worker wearing the mask when he/she evacuates from the site.

12. The display method according to claim 11, wherein control is performed so that the evacuation route generated based on a moving trajectory of the worker is displayed on the mask.

13. The display method according to claim 11, wherein control is performed so that the evacuation route generated according to an operation performed by a leader who leads in the site is displayed on the mask.

14. A non-transitory computer readable medium storing a program for causing a computer to perform operations comprising:
calculating a position of each of a plurality of working entities working in a site relative to a reference point by using distance measurement result information indicating results of measurements of distances performed by transmitting and receiving radio waves between a plurality of detection apparatuses each of which is attached to a respective one of the plurality of working entities;
performing control so that position information indicating the position of at least one working entity is displayed on a mask attached to a worker who is the working entity; and
performing control so that an evacuation route generated based on a moving trajectory of the worker is displayed on the mask, the evacuation route being one that is used by at least the worker wearing the mask when he/she evacuates from the site.

15. The non-transitory computer readable medium according to claim 14, wherein the program causes the computer to perform operations further comprising:

performing control so that a position of the worker wearing the mask is displayed more conspicuously than a position of a working entity different from the worker is.

16. The non-transitory computer readable medium according to claim 14, wherein the program causes the computer to perform operations further comprising:

performing control so that an evacuation route is displayed on the mask, the evacuation route being one that is used by at least the worker wearing the mask when he/she evacuates from the site.

17. The non-transitory computer readable medium according to claim 16, wherein the program causes the computer to perform operations further comprising:

performing control so that the evacuation route generated based on a moving trajectory of the worker is displayed on the mask.

18. The non-transitory computer readable medium according to claim 16, wherein the program causes the computer to perform operations further comprising:

performing control so that the evacuation route generated according to an operation performed by a leader who leads in the site is displayed on the mask.

* * * * *